(12) United States Patent
Matsunaga et al.

(10) Patent No.: US 11,440,538 B2
(45) Date of Patent: Sep. 13, 2022

(54) VEHICLE PARKING ASSIST APPARATUS

(71) Applicant: TOYOTA JIDOSHA KABUSHIKI KAISHA, Toyota (JP)

(72) Inventors: Yasutaka Matsunaga, Nisshin (JP); Yuusuke Nomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/998,568

(22) Filed: Aug. 20, 2020

(65) Prior Publication Data

US 2021/0107461 A1    Apr. 15, 2021

(30) Foreign Application Priority Data

Oct. 11, 2019    (JP) .............................. JP2019-187677

(51) Int. Cl.
| | | |
|---|---|---|
| *B60W 30/06* | (2006.01) | |
| *B62D 15/02* | (2006.01) | |
| *B60K 35/00* | (2006.01) | |
| *B60R 11/04* | (2006.01) | |

(52) U.S. Cl.
CPC .............. *B60W 30/06* (2013.01); *B60K 35/00* (2013.01); *B60R 11/04* (2013.01); *B62D 15/028* (2013.01); *B62D 15/0285* (2013.01); *B60K 2370/119* (2019.05); *B60K 2370/1438* (2019.05); *B60K 2370/175* (2019.05); *B60K 2370/176* (2019.05); *B60R 2300/105* (2013.01); *B60R 2300/806* (2013.01)

(58) Field of Classification Search
CPC . B60W 30/06; B60K 35/00; B60K 2370/175; B60K 2370/119; B60K 2370/176; B60K 2370/1438; B60R 11/04; B60R 2300/105; B60R 2300/806; B62D 15/028; B62D 15/0285
See application file for complete search history.

(56) References Cited

U.S. PATENT DOCUMENTS

| | | | | |
|---|---|---|---|---|
| 10,242,575 | B1 * | 3/2019 | Chan | .................... G06V 20/586 |
| 2009/0207044 | A1 * | 8/2009 | Tomita | .................... G08G 1/14 |
| | | | | 340/932.2 |
| 2016/0311429 | A1 | 10/2016 | Holland-Letz | |

(Continued)

FOREIGN PATENT DOCUMENTS

| | | | | |
|---|---|---|---|---|
| CN | 1605832 A | * | 4/2005 | ......... B62D 15/0285 |
| EP | 3813036 A1 | * | 4/2021 | ......... G06K 9/00812 |

(Continued)

*Primary Examiner* — Chico A Foxx
(74) *Attorney, Agent, or Firm* — Sughrue Mion, PLLC

(57) ABSTRACT

A vehicle parking assist apparatus registers information on a parking lot as parking lot information and executes a parking assist control with using the parking lot information. The vehicle parking assist apparats allows a user of a vehicle to request a deletion of the parking lot information as the vehicle parking assist apparatus executes the parking assist control without using the parking lot information and prevents the user of the vehicle from requesting the deletion of the parking lot information as the vehicle parking assist apparatus executes the parking assist control with using the parking lot information. The vehicle parking assist apparatus deletes the parking lot information when the deletion of the parking lot information is requested.

18 Claims, 24 Drawing Sheets

(56) References Cited

U.S. PATENT DOCUMENTS

| | | |
|---|---|---|
| 2019/0039605 A1 | 2/2019 | Iio et al. |
| 2019/0066514 A1* | 2/2019 | Yamamura ............. G08G 1/168 |
| 2019/0184981 A1* | 6/2019 | Jung .................... B60W 30/09 |
| 2021/0107462 A1* | 4/2021 | Matsunaga ............... B60R 1/00 |
| 2021/0269020 A1* | 9/2021 | Kubo .................... B60W 50/14 |
| 2021/0323538 A1* | 10/2021 | Takahashi .......... B62D 15/0285 |

FOREIGN PATENT DOCUMENTS

| | | | | |
|---|---|---|---|---|
| EP | 3527448 B1 | * | 5/2021 | ............ B60W 30/08 |
| GB | 2516738 A | * | 2/2015 | ............ B60W 30/06 |
| GB | 2553645 A | * | 3/2018 | ......... B62D 15/0285 |
| JP | 2017-503704 A | | 2/2017 | |
| JP | 2017-138664 A | | 8/2017 | |
| JP | 2019-038493 A | | 3/2019 | |
| KR | 20140052421 A | * | 5/2014 | ............ B60W 40/02 |
| KR | 20140142444 A | * | 12/2014 | ............ B60W 40/04 |
| KR | 102104900 B1 | * | 4/2020 | ............ B60W 30/09 |

\* cited by examiner

VEHICLE PARKING ASSIST APPARATUS

FIELD

The invention relates to a vehicle parking assist apparatus.

DESCRIPTION OF THE RELATED ART

There is known a vehicle parking assist apparatus which autonomously parks a vehicle in a parking lot without parking area lines such as white lines defining the parking areas. The parking lot without the parking area lines is, for example, a parking lot of a private house. The known vehicle parking assist apparatus registers parking lot information when the vehicle parking assist apparatus completes autonomously parking the vehicle. The parking lot information is information on the parking lot in which the vehicle has parked. When the known vehicle parking assist apparatus autonomously parks the vehicle in the same parking lot in which the vehicle has been autonomously parked before, the vehicle parking assist apparatus periodically acquires the parking lot information on the parking lot. The vehicle parking assist apparatus parks the vehicle in the same parking lot with comparing the acquired parking lot information with the registered parking lot information and realizing a relationship in position between the vehicle and the parking lot (for example, see JP 2017-138664 A).

If the registered parking lot information is deleted, the vehicle parking assist apparatus cannot use the registered parking lot information to autonomously park the vehicle in the parking lot. In this case, the vehicle parking assist apparatus may not park the vehicle in the parking lot.

The invention has been made for solving problems described above. An object of the invention is to provide a vehicle parking assist apparatus which can assuredly complete autonomously parking the vehicle in the parking lot after starting to execute a parking assist control to autonomously park the vehicle in the parking lot.

According to the invention, a vehicle parking assist apparatus comprises at least one sensor and an electronic control unit. The at least one sensor is mounted on a vehicle to detect information on a parking lot used to autonomously park the vehicle in the parking lot. The electronic control unit can execute a parking assist control to autonomously park the vehicle in the parking lot with using information on the parking lot detected by the at least one sensor.

The electronic control unit registers the information on the parking lot as parking lot information. In addition, the electronic control unit executes the parking assist control with using the parking lot information.

Further, the electronic control unit allows a user of the vehicle to request a deletion of the parking lot information as the electronic control unit executes the parking assist control without using the parking lot information. In addition, the electronic control unit prevents the user of the vehicle from requesting the deletion of the parking lot information as the electronic control unit executes the parking assist control with using the parking lot information. In this case, the electronic control unit deletes the parking lot information when the deletion of the parking lot information is requested.

According to the invention, the parking lot information cannot be deleted as the parking lot information is used to execute the parking assist control. Thus, the vehicle can be assuredly completed to be autonomously parked in the parking lot.

According to an aspect of the invention, the vehicle parking assist apparatus may further comprise a display. In this case, the electronic control unit may be able to display an information deleting image on the display to which the user of the vehicle can apply a touch interaction to request the deletion of the parking lot information. In this case, the electronic control unit may display the information deleting image on the display to allow the user of the vehicle to request the deletion of the parking lot information as the electronic control unit executes the parking assist control without using the parking lot information. In addition, the electronic control unit may not display the information deleting image on the display to prevent the user of the vehicle from requesting the deletion of the parking lot information as the electronic control unit executes the parking assist control with using the parking lot information.

According to this aspect of the invention, the information deleting image is not displayed on the display as the parking lot information is used to execute the parking assist control. Therefore, the user of the vehicle cannot apply the touch interaction to the information deleting image. Thus, the parking lot information cannot be deleted as the parking lot information is used to execute the parking assist control.

According to another aspect of the invention, the parking lot information may include a first parking lot information and a second parking lot information. In this case, the electronic control unit may allow the user of the vehicle to request the deletion of the first parking lot information and the deletion of the second parking lot information as the electronic control unit executes the parking assist control without using the first parking lot information and the second parking lot information. In addition, the electronic control unit may (i) allow the user of the vehicle to request the deletion of the first parking lot information and (ii) prevent the user of the vehicle from requesting the deletion of the second parking lot information as the electronic control unit executes the parking assist control with using the second parking lot information without using the first parking lot information. In addition, the electronic control unit may (i) allow the user of the vehicle to request the deletion of the second parking lot information and (ii) prevent the user of the vehicle from requesting the deletion of the first parking lot information as the electronic control unit executes the parking assist control with using the first parking lot information without using the second parking lot information.

According to this aspect of the invention, the first parking lot information cannot be deleted as the first parking lot information is used to execute the parking assist control. In addition, the second parking lot information cannot be deleted as the second parking lot information is used to execute the parking assist control.

According to further another aspect of the invention, the vehicle parking assist apparatus may further comprise a display. In this case, the electronic control unit may be able to display a first information deleting image on the display to which the user of the vehicle can apply a touch interaction to request the deletion of the first parking lot information and display a second information deleting image on the display to which the user of the vehicle can apply the touch interaction to request the deletion of the second parking lot information. In addition, the electronic control unit may display the first information deleting image and the second information deleting image on the display to allow the user of the vehicle to request the deletion of the first parking lot information and the deletion of the second parking lot information as the electronic control unit executes the parking assist control without using the first parking lot information and the second parking lot information. In addition, the electronic control unit may display the first information deleting image on the display without displacing the second information deleting image to (i) allow the user of the vehicle to request the deletion of the first parking lot information and (ii) prevent the user of the vehicle from requesting the deletion of the second parking lot information as the electronic control unit executes the parking assist control with using the second parking lot information without using the first parking lot information. In addition, the electronic control unit may display the second information deleting image on the display without displaying the first information deleting image to (i) allow the user of the vehicle to request the deletion of the second parking lot information and (ii) prevent the user of the vehicle from requesting the deletion of the first parking lot information as the electronic control unit executes the parking assist control with using the first parking lot information without using the second parking lot information.

According to this aspect of the invention, the first information deleting image is not displayed on the display as the first parking lot information is used to execute the parking assist control. Similarly, the second information deleting image is not displayed on the display as the second parking lot information is used to execute the parking assist control. Therefore, the user of the vehicle cannot apply the touch interaction to the first information deleting image as the first parking lot information is used to execute the parking assist control. Similarly, the user of the vehicle cannot apply the touch interaction to the second information deleting image as the second parking lot information is used to execute the parking assist control. Thus, the first parking lot information cannot be deleted as the first parking lot information is used to execute the parking assist control. In addition, the second parking lot information cannot be deleted as the second parking lot information is used to execute the parking assist control.

According to further another aspect of the invention, the parking log information may include a first parking lot information and a second parking lot information. In this case, the electronic control unit may allow the user of the vehicle to request the deletion of the first parking lot information and the deletion of the second parking lot information as the electronic control unit executes the parking assist control without using the first parking lot information and the second parking lot information. In addition, the electronic control unit may prevent the user of the vehicle from requesting the deletion of the first parking lot information and the deletion of the second parking lot information as the electronic control unit executes the parking assist control with using the second parking lot information without using the first parking lot information. In addition, the electronic control unit may prevent the user of the vehicle from requesting the deletion of the first parking lot information and the deletion of the second parking lot information as the electronic control unit executes the parking assist control with using the first parking lot information without using the second parking lot information.

According to this aspect of the invention, the first parking lot information cannot be deleted as the first parking lot information is used to execute the parking assist control. In addition, the second parking lot information cannot be deleted as the second parking lot information is used to execute the parking assist control.

According to further another aspect of the invention, the vehicle parking assist apparatus may further comprise a display. In this case, the electronic control unit may be able to display a first information deleting image on the display to which the user of the vehicle can apply a touch interaction to request the deletion of the first parking lot information and display a second information deleting image on the display to which the user of the vehicle can apply the touch interaction to request the deletion of the second parking lot information. In addition, the electronic control unit may display the first information deleting image and the second information deleting image on the display to allow the user of the vehicle to request the deletion of the first parking lot information and the deletion of the second parking lot information as the electronic control unit executes the parking assist control without using the first parking lot information and the second parking lot information. In addition, the electronic control unit may not display the first information deleting image and the second information deleting image on the display to prevent the user of the vehicle from requesting the deletion of the first parking lot information and the deletion of the second parking lot information as the electronic control unit executes the parking assist control with using the second parking lot information without using the first parking lot information. In addition, the electronic control unit may not display the first information deleting image and the second information deleting image on the display to prevent the user of the vehicle from requesting the deletion of the first parking lot information and the deletion of the second parking lot information as the electronic control unit executes the parking assist control with using the first parking lot information without using the second parking lot information.

According to this aspect of the invention, the first information deleting image and the second information deleting image are not displayed on the display as any one of the first parking lot information and the second parking lot information is used to execute the parking assist control. Therefore, the user of the vehicle cannot apply the touch interaction to the first information deleting image and the second information deleting image as any one of the first parking lot information and the second parking lot information is used to execute the parking assist control. Thus, the first parking lot information and the second parking lot information cannot be deleted as any one of the first parking lot information and the second parking lot information is used to execute the parking assist control.

According to further another aspect of the invention, the at least one sensor may be at least one camera mounted on the vehicle to take images of views surrounding the vehicle. In this case, the at least one camera may detect information on the taken image of the parking lot as the information on the parking lot.

According to further another aspect of the invention, the at least one camera may include a front camera which takes the image of the view ahead of the vehicle, rear camera which takes the image of the view behind the vehicle, a left camera which takes the image of the view at the left side of the vehicle, and a right camera which takes the image of the view at the right side of the vehicle.

According to further another aspect of the invention, the at least one sensor may be at least one camera mounted on the vehicle to take images of views surrounding the vehicle. In this case, the at least one camera may detect information on feature points in the taken image of the parking lot as the information on the parking lot.

According to further another aspect of the invention, the electronic control unit may execute the parking assist control with realizing a relationship in position between the vehicle and the parking lot by comparing the information on the parking lot currently detected by the at least one sensor with the parking lot information.

According to the invention, a vehicle parking assist apparatus comprises at least one sensor and an electronic control unit. The at least one sensor is mounted on a vehicle to detect information on a parking lot used to autonomously park the vehicle in the parking lot. The electronic control unit can execute a parking assist control to autonomously park the vehicle in the parking lot with using information on the parking lot detected by the at least one sensor.

The electronic control unit registers the information on the parking lot as parking lot information and executes the parking assist control with using the parking lot information.

Further, the electronic control unit deletes the parking lot information when a deletion of the parking lot information is requested by a user of the vehicle as the electronic control unit executes the parking assist control without using the parking lot information. In addition, the electronic control unit does not delete the parking lot information even when the deletion of the parking lot information is requested by the user of the vehicle as the electronic control unit executes the parking assist control with using the parking lot information.

According to further another aspect of the invention, the vehicle parking assist apparatus may further comprise a display. In this case, the electronic control unit may display an information deleting image on the display to which the user of the vehicle can apply a touch interaction to request the deletion of the parking lot information. In this case, the electronic control unit may determine that the deletion of the parking lot information is requested when the touch interaction is applied to the information deleting image.

According to this aspect of the invention, the parking lot information cannot be deleted even when the information deleting image is displayed on the display as the parking lot information is used to execute the parking assist control.

According to further another aspect of the invention, the parking lot information may include a first parking lot information and a second parking lot information. In this case, the electronic control unit may delete the first parking lot information when the deletion of the first parking lot information is requested as the electronic control unit executes the parking assist control without using the first parking lot information and the second parking lot information. In addition, the electronic control unit may delete the second parking lot information when the deletion of the second parking lot information is requested as the electronic control unit executes the parking assist control without using the first parking lot information and the second parking lot information. In addition, the electronic control unit may delete the first parking lot information when the deletion of the first parking lot information is requested as the electronic control unit executes the parking assist control with using the second parking lot information without using the first parking lot information. In addition, the electronic control unit may not delete the second parking lot information even when the deletion of the second parking lot information is requested as the electronic control unit executes the parking assist control with using the second parking lot information without using the first parking lot information. In addition, the electronic control unit may delete the second parking lot information when the deletion of the second parking lot information is requested as the electronic control unit executes the parking assist control with using the first parking lot information without using the second parking lot information. In addition, the electronic control unit may not delete the first parking lot information even when the deletion of the first parking lot information is requested as the electronic control unit executes the parking assist control with using the first parking lot information without using the second parking lot information.

According to this aspect of the invention, the first parking lot information cannot be deleted as the first parking lot information is used to execute the parking assist control. In addition, the second parking lot information cannot be deleted as the second parking lot information is used to execute the parking assist control.

According to further another aspect of the invention, the vehicle parking assist apparatus may further comprise a display. In this case, the electronic control unit may (i) display a first information deleting image on the display to which the user of the vehicle can apply a touch interaction to request the deletion of the first parking lot information and (ii) display a second information deleting image on the display to which the user of the vehicle can apply the touch interaction to request the deletion of the second parking lot information. In this case, the electronic control unit may determine that the deletion of the first parking lot information is requested when the touch interaction is applied to the first information deleting image. In addition, the electronic control unit may determine that the deletion of the second parking lot information is requested when the touch interaction is applied to the second information deleting image.

According to further another aspect of the invention, the at least one sensor may be at least one camera mounted on the vehicle to take images of a view surrounding the vehicle. In this case, the at least one camera may detect information on the images of the parking lot as the information on the parking lot.

According to further another aspect of the invention, the at least one camera may include a front camera which takes the image of the view ahead of the vehicle, a rear camera which takes the image of the view behind the vehicle, a left camera which takes the image of the view at the left side of the vehicle, and a right camera which takes the image of the view at the right side of the vehicle.

According to further another aspect of the invention, the at least one sensor may be at least one camera mounted on the vehicle to take images of views surrounding the vehicle. In this case, the at least one camera may detect information on feature points in the taken image of the parking lot as the information on the parking lot.

According to further another aspect of the invention, the electronic control unit may execute the parking assist control with realizing a relationship in position between the vehicle and the parking lot by comparing the information on the parking lot currently detected by the at least one sensor with the parking lot information.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE PREFERRED EMBODIMENTS

Figure 1:
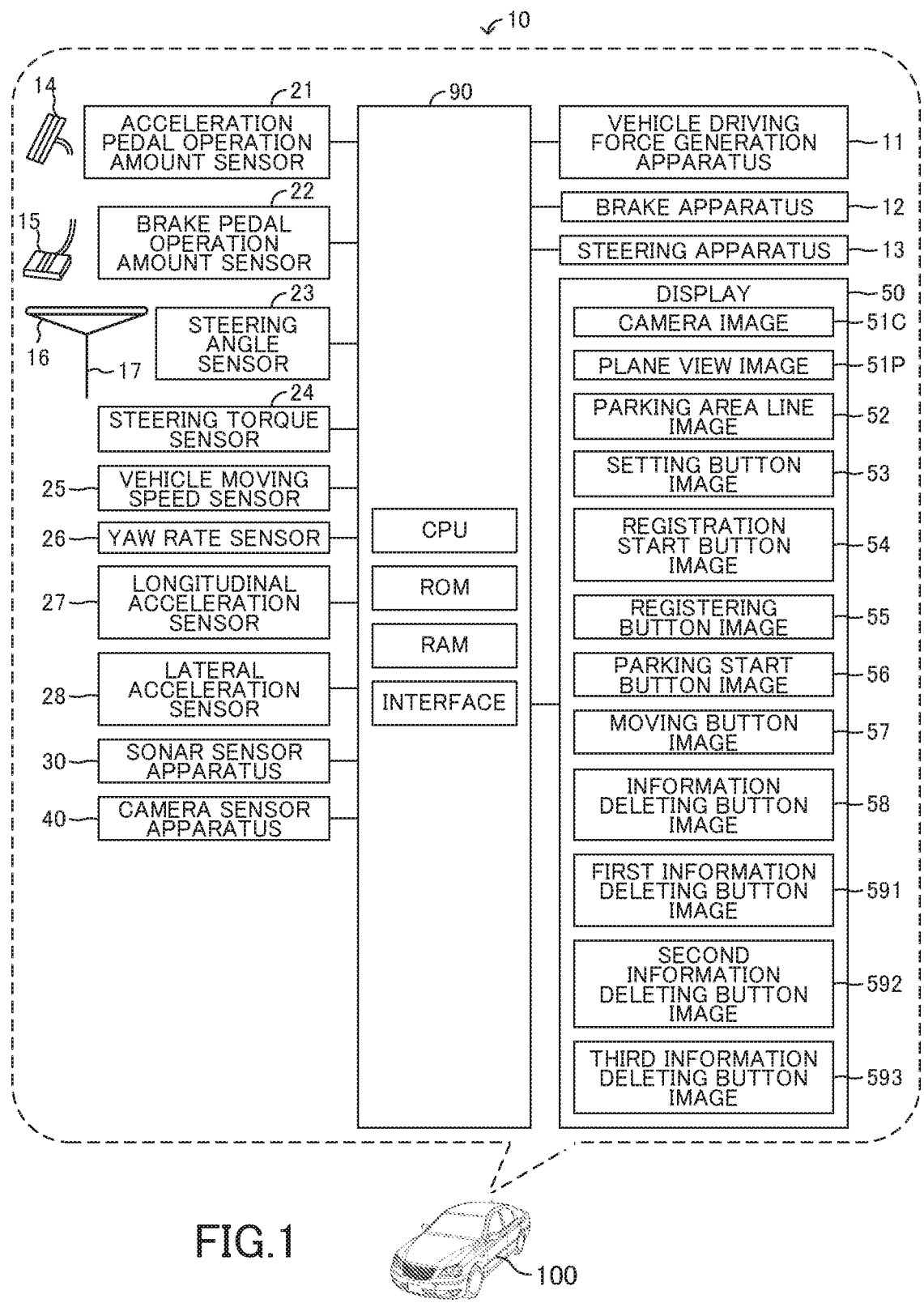
FIG. 1 is a view which shows a vehicle parking assist apparatus according to an embodiment of the invention and a vehicle to which the vehicle parking assist apparatus according to the embodiment of the invention is applied.

Below, a vehicle parking assist apparatus according to an embodiment of the invention will be described with reference to the drawings. FIG. 1 shows the vehicle parking assist apparatus 10 according to the embodiment of the invention and a vehicle 100 to which the vehicle parking assist apparatus 10 is applied.

As shown in FIG. 1, the vehicle parking assist apparatus 10 includes an ECU 90. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines memorized in the ROM.

The vehicle 100 is installed with a vehicle driving force generation apparatus 11, a brake apparatus 12, and a steering apparatus 13. The vehicle driving force generation apparatus 11 generates a driving force for driving the vehicle 100 and applies the driving force to wheels to be driven of the vehicle 100. The vehicle driving force generation apparatus 11 is, for example, an internal combustion engine and/or electric motor. The brake apparatus 12 applies braking forces to vehicle wheels of the vehicle 100 to brake the vehicle 100. The steering apparatus 13 applies a steering torque to wheels to be steered of the vehicle 100 to steer the vehicle 100.

The vehicle driving force generation apparatus 11, the brake apparatus 12, and the steering apparatus 13 are electrically connected to the ECU 90. The ECU 90 controls operations of the vehicle driving force generation apparatus 11 to control the driving force applied to the wheels to be driven of the vehicle 100. Further, the ECU 90 controls operations of the brake apparatus 12 to control the braking forces applied to the vehicle wheels of the vehicle 100. Further, the ECU 90 controls operations of the steering apparatus 13 to control the steering torque applied to the wheels to be steered of the vehicle 100.

<Sensors>

The vehicle parking assist apparatus 10 includes an acceleration pedal operation amount sensor 21, a brake pedal operation amount sensor 22, a steering angle sensor 23, a steering torque sensor 24, a vehicle moving speed sensor 25, a yaw rate sensor 26, a longitudinal acceleration sensor 27, a lateral acceleration sensor 28, a sonar sensor apparatus 30, a camera sensor apparatus 40, and a display 50.

The acceleration pedal operation amount sensor 21 is electrically connected to the ECU 90. The ECU 90 detects an amount AP of an operation applied to an acceleration pedal 14 by the acceleration pedal operation amount sensor 21 and acquires the amount AP as an acceleration pedal operation amount AP. The ECU 90 controls the operations of the vehicle driving force generation apparatus 11 to apply the driving force to the wheels to be driven of the vehicle 100 from the vehicle driving force generation apparatus 11, depending on the acquired acceleration pedal operation amount AP.

The brake pedal operation amount sensor 22 is electrically connected to the ECU 90. The ECU 90 detects an amount BP of an operation applied to a brake pedal 15 by the brake pedal operation amount sensor 22 and acquires the amount BP as a brake pedal operation amount BP. The ECU 90 controls the operations of the brake apparatus 12 to apply the braking forces to the vehicle wheels of the vehicle 100 from the brake apparatus 12, depending on the acquired brake pedal operation amount BP.

The steering angle sensor 23 is electrically connected to the ECU 90. The ECU 90 detects an angle θst of rotation of a steering wheel 16 relative to a center position by the steering angle sensor 23 and acquires the angle θst as a steering angle θst.

The steering torque sensor 24 is electrically connected to the ECU 90. The ECU 90 detects a torque TQst input to a steering shaft 17 by a driver of the vehicle 100 by the steering torque sensor 24 and acquires the torque TQst as a steering torque TQst.

The ECU 90 controls the operations of the steering apparatus 13 to apply the steering torque to the wheels to be steered of the vehicle 100 from the steering apparatus 13, depending on the acquired steering angle θst and the acquired steering torque TQst.

The vehicle moving speed sensor 25 is electrically connected to the ECU 90. The ECU 90 detects rotation speeds Vrot of the vehicle wheels of the vehicle 100 by the vehicle moving speed sensor 25 and acquires the rotation speeds Vrot of the vehicle wheels of the vehicle 100. The ECU 90 acquires a moving speed SPD of the vehicle 100 as a vehicle moving speed SPD, based on the acquired rotation speeds Vrot of the vehicle wheels of the vehicle 100.

The yaw rate sensor 26 is electrically connected to the ECU 90. The ECU 90 detects a yaw rate YR of the vehicle 100 by the yaw rate sensor 26 and acquires the yaw rate YR of the vehicle 100 as a vehicle yaw rate YR.

The longitudinal acceleration sensor 27 is electrically connected to the ECU 90. The ECU 90 detects a longitudinal acceleration Gx of the vehicle 100 by the longitudinal acceleration sensor 27 and acquires the longitudinal acceleration Gx as a vehicle longitudinal acceleration Gx.

The lateral acceleration sensor 28 is electrically connected to the ECU 90. The ECU 90 detects a lateral acceleration Gy of the vehicle 100 by the lateral acceleration sensor 28 and acquires the lateral acceleration Gy as a vehicle lateral acceleration Gy.

The sonar sensor apparatus 30 includes a first clearance sonar 301 to a twelfth clearance sonar 312.

Figure 2:
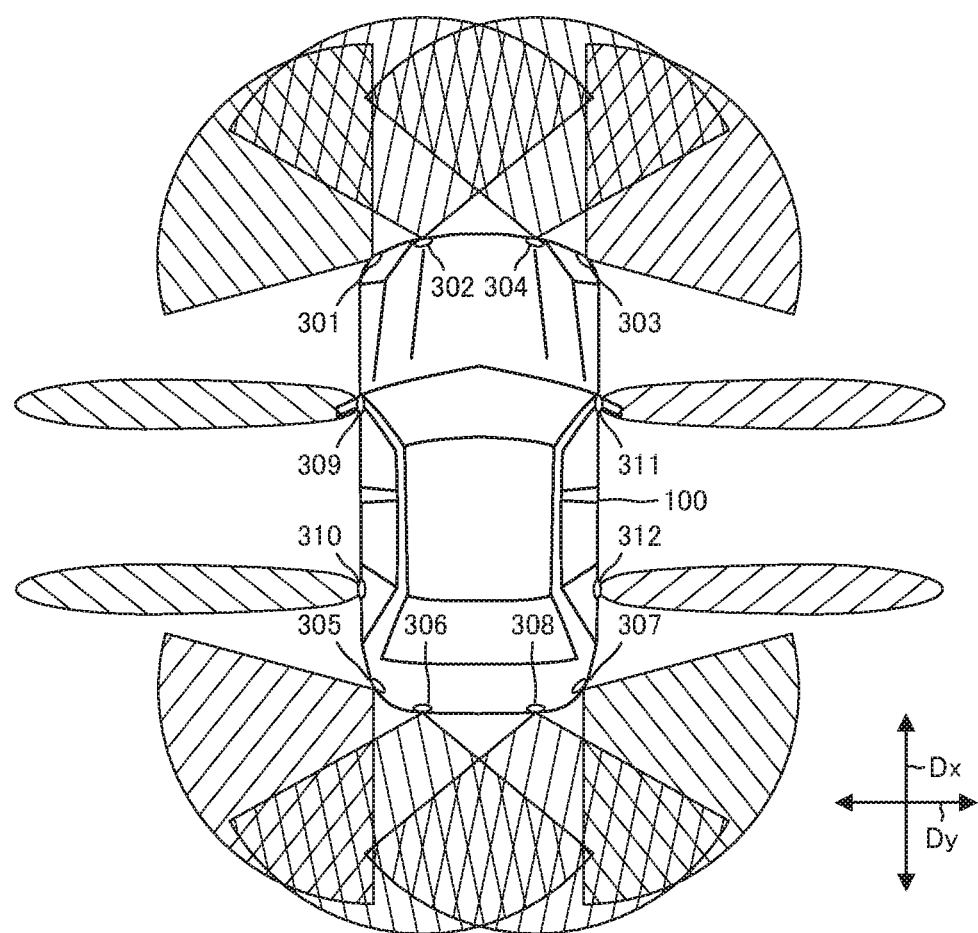
FIG. 2 is a view which shows a sonar sensor apparatus and detection ranges of the sonar sensor apparatus.

As shown in FIG. 2, the first clearance sonar 301 is mounted on a left end of a front end portion of the vehicle 100 to radiate sonic waves forward left. The second clearance sonar 302 is mounted on the front end portion of the vehicle 100 between the left end of the front end of the vehicle 100 and a center of the front end portion of the vehicle 100 to radiate the sonic waves forward straight. The third clearance sonar 303 is mounted on a right end of the front end portion of the vehicle 100 to radiate the sonic waves forward right. The fourth clearance sonar 304 is mounted on the front end portion of the vehicle 100 between the right end of the front end portion of the vehicle 100 and the center of the front end portion of the vehicle 100 to radiate the sonic waves forward straight.

The fifth clearance sonar 305 is mounted on a left end of a rear end portion of the vehicle 100 to radiate the sonic waves rearward left. The sixth clearance sonar 306 is mounted on the rear end portion of the vehicle 100 between the left end of the rear end portion of the vehicle 100 and a center of the rear end portion of the vehicle 100 to radiate the sonic waves rearward straight. The seventh clearance sonar 307 is mounted on a right end of the rear end portion of the vehicle 100 to radiate the sonic waves rearward right. The eighth clearance sonar 308 is mounted on the rear end portion of the vehicle 100 between the right end of the rear end portion of the vehicle 100 and the center of the rear end portion of the vehicle 100 to radiate the sonic waves rearward straight.

The ninth clearance sonar 309 is mounted on a front side of a left side portion of the vehicle 100 to radiate the sonic waves leftward straight. The tenth clearance sonar 310 is mounted on a rear side of the left side portion of the vehicle 100 to radiate the sonic waves leftward straight. The eleventh clearance sonar 311 is mounted on a front side of a right side portion of the vehicle 100 to radiate the sonic waves rightward straight. The twelfth clearance sonar 312 is mounted on a rear side of the right side portion of the vehicle 100 to radiate the sonic waves rightward straight.

The first clearance sonar 301 to the twelfth clearance sonar 312 receive the sonic waves reflected by objects.

The sonar sensor apparatus 30 is electrically connected to the ECU 90. The sonar sensor apparatus 30 sends information on (i) the sonic waves radiated from the first clearance sonar 301 to the twelfth clearance sonar 312 and (ii) the sonic waves received by the first clearance sonar 301 to the twelfth clearance sonar 312. The ECU 90 acquires information on the objects around the vehicle 100 as object information OBJ, based on the information sent from the sonar sensor apparatus 30. Hereinafter, the information sent from the sonar sensor apparatus 30 will be referred to as "the sonar information SON."

A direction Dx shown in FIG. 2 is a longitudinal direction of the vehicle 100. Hereinafter, the direction Dx will be referred to as "the vehicle longitudinal direction Dx." A direction Dw shown in FIG. 2 is a width direction of the vehicle 100. Hereinafter, the direction Dw will be referred to as "the vehicle width direction Dy."

The camera sensor apparatus 40 includes a front camera 41, a rear camera 42, a left camera 43, and a right camera 44. Hereinafter, the cameras 45 includes the front camera 41, the rear camera 42, the left camera 43, and the right camera 44.

Figure 3:
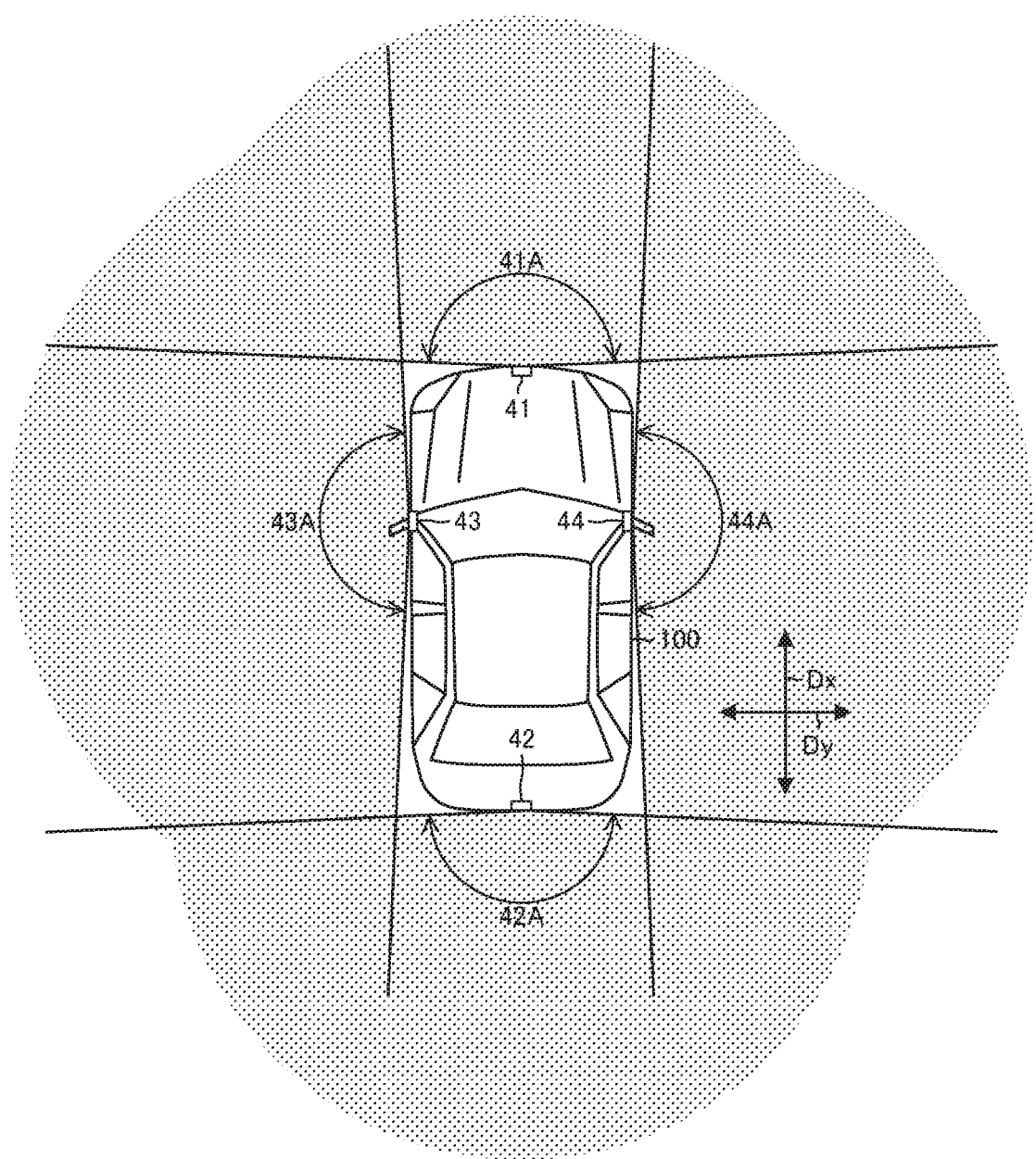
FIG. 3 is a view which shows a camera sensor apparatus and detection ranges of the camera sensor apparatus.

As shown in FIG. 3, the front camera 41 is mounted on the center of the front end portion of the vehicle 100 to take images of a view ahead of the vehicle 100. A field angle 41A of the front camera 41 is about 180 degrees. The rear camera 42 is mounted on the center of the rear end portion of the vehicle 100 to take images of a view behind the vehicle 100. A field angle 42A of the rear camera 42 is about 180 degrees. The left camera 43 is mounted on the left side portion of the vehicle 100 to take images of a view at the left of the vehicle 100. A field angle 43A of the left camera 43 is about 180 degrees. The right camera 44 is mounted on the right side portion of the vehicle 100 to take images of a view at the right of the vehicle 100. A field angle 44A of the right camera 44 is about 180 degrees.

The camera sensor apparatus 40 is electrically connected to the ECU 90. The ECU 90 acquires information on the images of the views taken by the cameras 45 of the camera sensor apparatus 40.

Hereinafter, the information on the images of the view taken by the front camera 41 will be referred to as "the front image information IMG1." Also, the information on the images of the view taken by the rear camera 42 will be referred to as "the rear image information IMG2." Also, the information on the images of the view taken by the left camera 43 will be referred to as "the left image information IMG3." Also, the information on the images of the view taken by the right camera 44 will be referred to as "the right image information IMG4." Further, the front image information IMG1, the rear image information IMG2, the left image information IMG3, and the right image information IMG4 will be collectively referred to as "the image information IMG."

The vehicle parking assist apparatus 10 acquires feature points F, based on the image information IMG when a predetermined condition becomes satisfied. The feature point F is a predetermined area of the image taken by each of the cameras 45 having a luminance level largely different from the luminance level of an area of the image surrounding the predetermined area.

Figure 4:
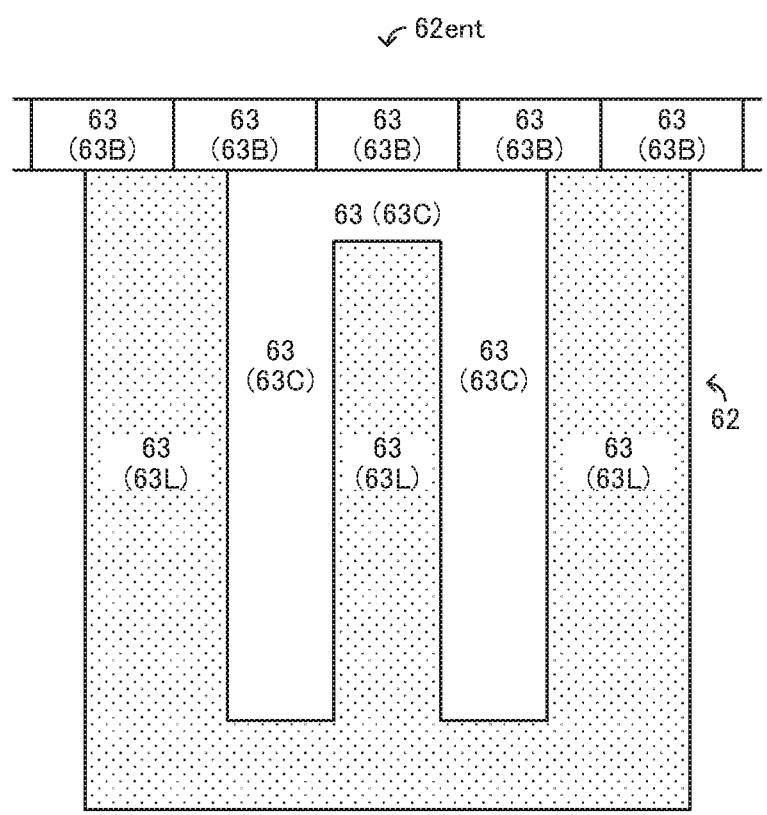
FIG. 4 is a view which shows an example of a parking lot.

For example, when the cameras 45 take the images of a parking lot 62 shown in FIG. 4, the acquired feature points F are corner portions of concrete blocks 63B, corner portions of the ground 63 of lawn 63L, and border portions between the ground 63 of the block 63B and the ground 63 of the lawn 63L.

The ground 63 of the parking lot 62 shown in FIG. 4 is formed by the ground 63 of concrete 63C and the ground 63 of the lawn 63L. Further, the concrete blocks 63B closing road gutters are provided alongside at an entrance 62*ent* of the parking lot 62. Therefore, the ground 63 of the entrance 62*ent* of the parking lot 62 is formed by surfaces of the blocks 63B.

Figure 5:
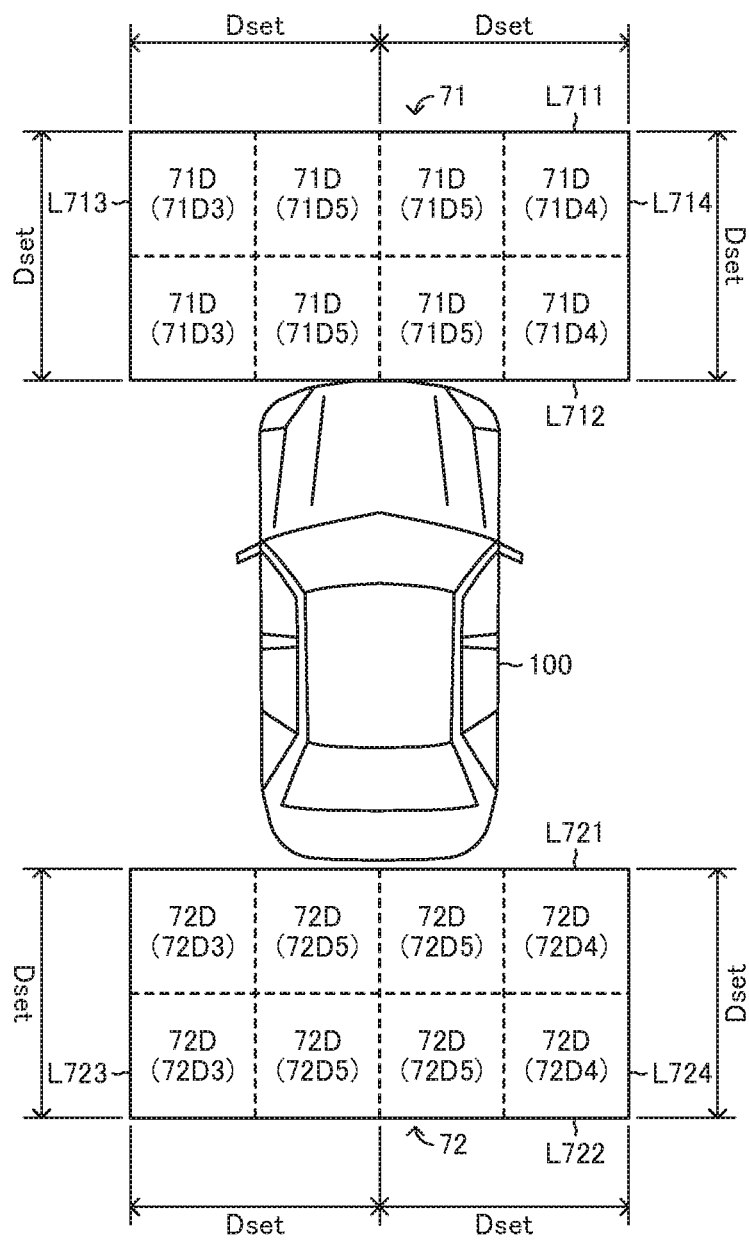
FIG. 5 is a view which shows a front area and a rear area.

The vehicle parking assist apparatus 10 acquires the feature points F in a predetermined area 71 of the ground 63 located on the front side of the vehicle 100, based on the front image information IMG1 (see FIG. 5). Hereinafter, the feature points F in the predetermined area 71 will be referred to as "the front feature points F." In addition, the vehicle parking assist apparatus 10 acquires the feature points F in a predetermined area 72 of the ground 63 located on the rear side of the vehicle 100, based on the rear image information IMG2 (see FIG. 5). Hereinafter, the feature points F in the predetermined area 72 will be referred to as "the rear feature points F." In addition, the vehicle parking assist apparatus 10 acquires the feature points F in a predetermined area 73 of the ground 63 located on the left side of the vehicle 100, based on the left image information IMG3 (see FIG. 6). Hereinafter, the feature points F in the predetermined area 73 will be referred to as "the left feature points F3." In addition, the vehicle parking assist apparatus 10 acquires the feature points F in a predetermined area 74 of the ground 63 located on the right side of the vehicle 100, based on the right image information IMG4 (see FIG. 6). Hereinafter, the feature points F in the predetermined area 74 will be referred to as "the right feature points F4."

As shown in FIG. 5, the predetermined area 71 is an area defined by a line L711, a line L712, a line L713, and a line L714. The line L711 extends parallel to the vehicle width direction Dy, passing through a point away forward from the front camera 41 by a predetermined distance Dset. The line L712 extends parallel to the vehicle width direction Dy, passing through the front camera 41. The line L713 extends parallel to the vehicle longitudinal direction Dx, passing through a point away leftward from the front camera 41 by the predetermined distance Dset. The line L714 extends parallel to the vehicle longitudinal direction Dx, passing through a point away rightward from the front camera 41 by the predetermined distance Dset. Hereinafter, the predetermined area 71 will be referred to as "the front area 71."

The front area 71 is quadrisected in the vehicle width direction Dy and bisected in the vehicle longitudinal direction Dx. Therefore, the front area 71 includes eight areas 71D. In other words, the front area 71 is divided into the eight areas 71D having the same sizes. Hereinafter, each of the areas 71D will be referred to as "the front divided area 71D." Further, each of two of the front divided areas 71D located at the left end of the front area 71 in the vehicle width direction Dy will be referred to as "the left end divided area 71D3." Further, each of two of the front divided areas 71D located at the right end of the front area 71 in the vehicle width direction Dy will be referred to as "the right end divided area 71D4." Further, each of four of the front divided areas 71D located in the middle of the front area 71 in the vehicle width direction Dy will be referred to as "the middle divided area 71D5."

As shown in FIG. 5, the predetermined area 72 is an area defined by a line L721, a line L722, a line L723, and a line L724. The line L721 extends parallel to the vehicle width direction Dy, passing through the rear camera 42. The line L722 extends parallel to the vehicle width direction Dy, passing through a point away rearward from the rear camera 42 by the predetermined distance Dset. The line L723 extends parallel to the vehicle longitudinal direction Dx, passing through a point away leftward from the rear camera 42 by the predetermined distance Dset. The line L724 extends parallel to the vehicle longitudinal direction Dx, passing through a point away rightward from the rear camera 42 by the predetermined distance Dset. Hereinafter, the predetermined area 72 will be referred to as "the rear area 72."

The rear area 72 is quadrisected in the vehicle width direction Dy and bisected in the vehicle longitudinal direction Dx. Therefore, the rear area 72 includes eight areas 72D. In other words, the rear area 72 is divided into the eight areas 72D having the same sizes. Hereinafter, each of the areas 72D will be referred to as "the rear divided area 72D." Further, each of two of the rear divided areas 72D located at the left end of the rear area 72 in the vehicle width direction Dy will be referred to as "the left end divided area 7203." Further, each of two of the rear divided areas 72D located at the right end of the rear area 72 in the vehicle width direction Dy will be referred to as "the right end divided area 72D4." Further, each of four of the rear divided areas 72D located in the middle of the rear area 72 in the vehicle width direction Dy will be referred to as "the middle divided area 72D5."

Figure 6:
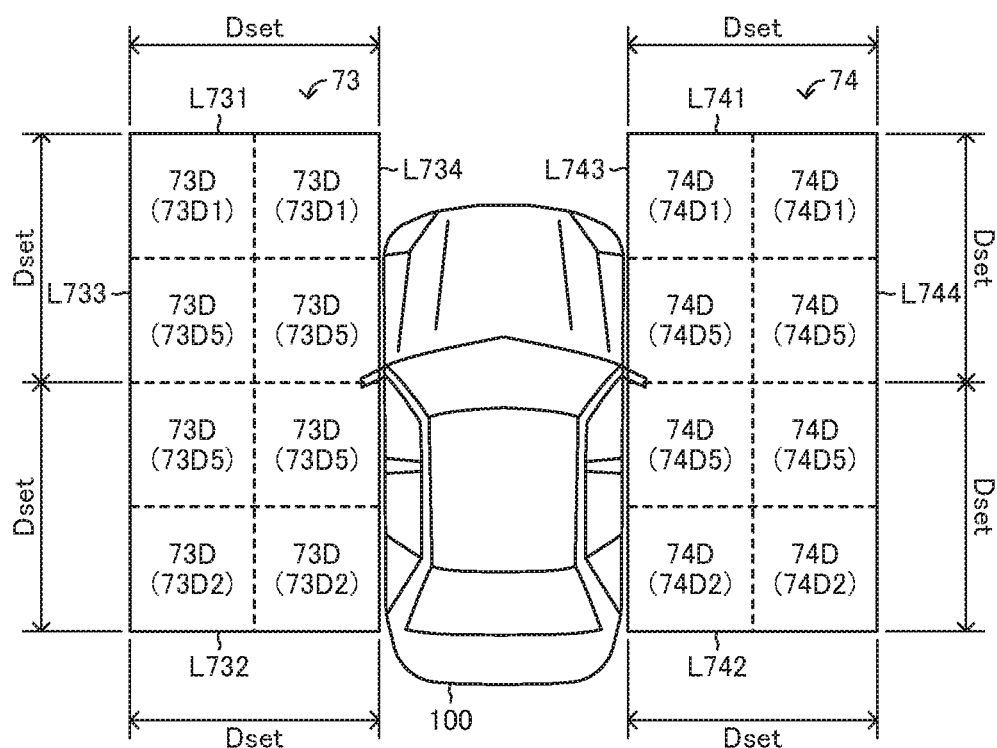
FIG. 6 is a view which shows a left area and a right area.

As shown in FIG. 6, the predetermined area 73 is an area defined by a line L731, a line L732, a line L733, and a line L734. The line L731 extends parallel to the vehicle width direction D, passing through a point away forward from the left camera 43 by the predetermined distance Dset. The line L732 extends parallel to the vehicle width direction Dy, passing through a point away rearward from the left camera 43 by the predetermined distance Dset. The line L733 extends parallel to the vehicle longitudinal direction Dx, passing through a point away leftward from the left camera 43 by the predetermined distance Dset. The line L734 extends parallel to the vehicle longitudinal direction Dx, passing through the left camera 43. Hereinafter, the predetermined area 73 will be referred to as "the left area 73."

The left area 73 is quadrisected in the vehicle longitudinal direction Dx and bisected in the vehicle width direction Dy. Therefore, the left area 73 includes eight areas 73D. In other words, the left area 73 is divided into the eight areas 73D having the same sizes. Hereinafter, each of the areas 73D will be referred to as "the left divided area 73D." Further, each of two of the left divided areas 73D located at the front end of the left area 73 in the vehicle longitudinal direction Dx will be referred to as "the front end divided area 73D1." Further, each of two of the left divided areas 73D located at the rear end of the left area 73 in the vehicle longitudinal direction Dx will be referred to as "the rear end divided area 73D2." Further, each of four of the left divided areas 73D located in the middle of the left area 73 in the vehicle longitudinal direction Dx will be referred to as "the middle divided area 73D5."

As shown in FIG. 6, the predetermined area 74 is an area defined by a line L741, a line L742, a line L743, and a line L744. The line L741 extends parallel to the vehicle width direction D, passing through a point away forward from the right camera 44 by the predetermined distance Dset. The line L742 extends parallel to the vehicle width direction Dy, passing through a point away rearward from the right camera 44 by the predetermined distance Dset. The line L743 extends parallel to the vehicle longitudinal direction Dx, passing through the right camera 44. The line L744 extends parallel to the vehicle longitudinal direction Dx, passing through a point away rightward from the right camera 44 by the predetermined distance Dset. Hereinafter, the predetermined area 74 will be referred to as "the right area 74."

The right area 74 is quadrisected in the vehicle longitudinal direction Dx and bisected in the vehicle width direction Dy. Therefore, the right area 74 includes eight areas 74D. In other words, the right area 74 is divided into the eight areas 74D having the same sizes. Hereinafter, each of the areas 74D will be referred to as "the right divided area 74D." Further, each of two of the right divided areas 74D located at the front end of the right area 74 in the vehicle longitudinal direction Dx will be referred to as "the front end divided area 74D1." Further, each of two of the right divided areas 74D located at the rear end of the right area 74 in the vehicle longitudinal direction Dx will be referred to as "the rear end divided area 74D2." Further, each of four of the right divided areas 74D located in the middle of the right area 74 in the vehicle longitudinal direction Dx will be referred to as "the middle divided area 74D5."

Figure 7:
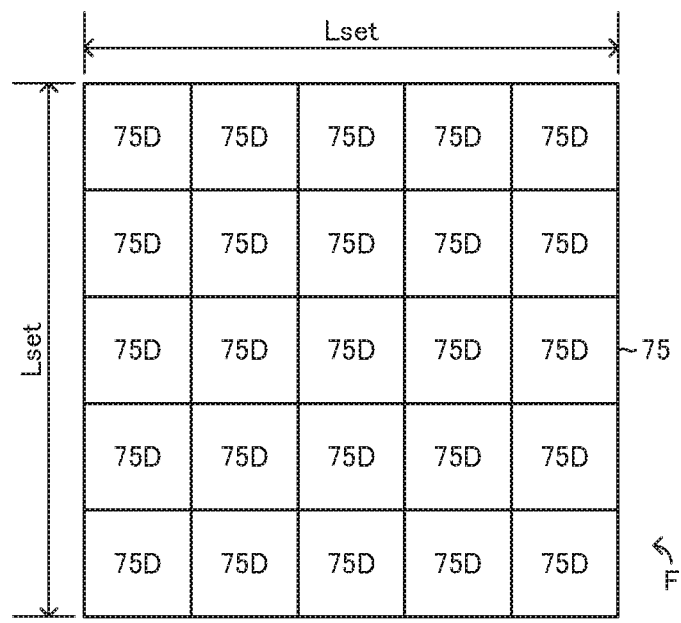
FIG. 7 is a view which shows a feature point.

As shown in FIG. 7, when the image of each of the feature points F taken by the cameras 45 is converted into an image in a planar view, the converted image is a square area 75 defined by sides of predetermined lengths Lset. When a predetermined condition becomes satisfied, the vehicle parking assist apparatus 10 divides each of the feature points F into twenty five square areas 75D having the same sizes and acquires luminance values LUM of the areas 75D. Then, the vehicle parking assist apparatus 10 acquires values ΔLUM by subtracting an average value LUMave of the acquired luminance values WM from each of the luminance values LUM (ΔLUM=LUM−LUMave). Then, the vehicle parking assist apparatus 10 acquires differences between the luminance values LUM of the feature point F, based on the values ΔLUM. Then, the vehicle parking assist apparatus 10 acquires a pattern of the acquired differences as luminance pattern information CT. Basically, when the predetermined condition becomes satisfied, the vehicle parking assist apparatus 10 acquires a luminance pattern of each of the images of the feature points F taken by the cameras 45 and acquires the acquired luminance patterns as the luminance pattern information CT.

The display 50 is provided at a portion of the vehicle 100 where the driver can see. In this embodiment, the display 50 is a display of a so-called navigation apparatus.

The display 50 is electrically connected to the ECU 90. The ECU 90 can cause the display 50 to display various images. In this embodiment, the ECU 90 can cause the display 50 to display a camera image 51C, a plane view image 51P, a parking area line image 52, a setting button image 53, a registration start button image 54, a registering button image 55, a parking start button image 56, a displacing button image 57, an information deleting button image 58, a first information deleting button image 591, a second information deleting button image 592, and a third information deleting button image 593.

The camera image 51C is an image taken by any one of the cameras 45.

The plane view image 51P is an image including a vehicle plane view image and a vehicle surrounding image. The vehicle plane view image is an image displaying the vehicle 100, viewed vertically from the above. The vehicle surrounding image is an image displaying surroundings of the vehicle 100, viewed vertically from the above. The vehicle surrounding image includes at least an image displaying the parking lot 62. The vehicle plane view image and the vehicle surrounding image are prepared by the ECU 90, based on the image information IMG.

Figure 8:
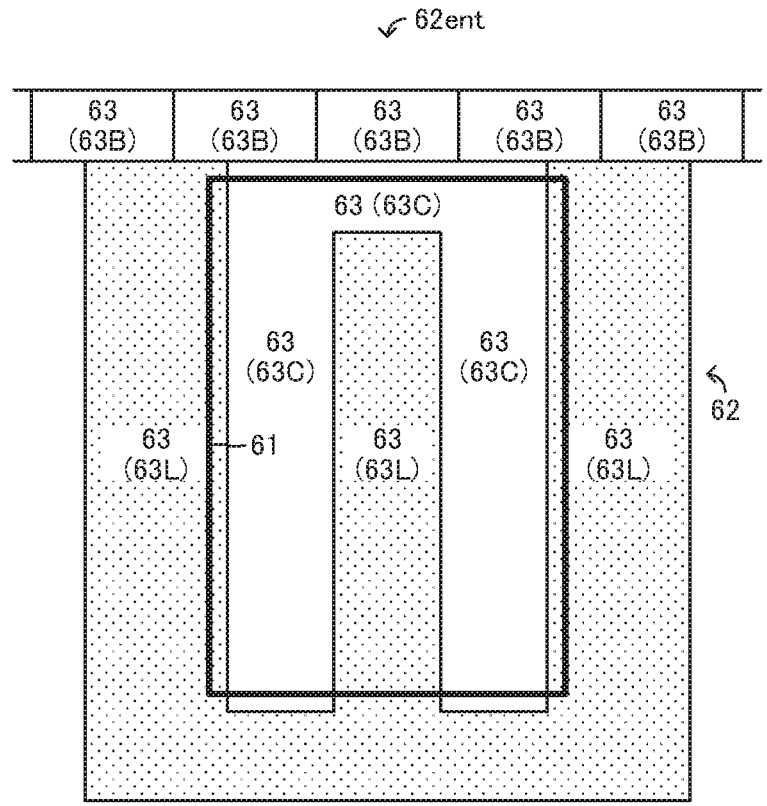
FIG. 8 is a view which shows a parking area.

The parking area line image 52 is an image displaying the parking area 61. The parking area 61 is an area or a space or a region in which the vehicle 100 is parked by a parking assist control described below. As shown in FIG. 8, the parking area 61 is set in the parking lot 62.

The setting button image 53 is an image displaying a setting button to which the driver can apply a touch interaction to set or fix or determine the parking area 61 in which the driver desires to park the vehicle 100 by the parking assist control.

The registration start button image 54 is an image displaying a registration start button to which the driver can apply the touch interaction to cause the vehicle parking assist apparatus 10 to start an execution of a first parking moving process described later of the parking assist control.

The parking start button image 56 is an image displaying a parking start button to which the driver can apply the touch interaction to cause the vehicle parking assist apparatus 10 to start an execution of the parking assist control to park the vehicle 100 in the parking area 61 registered in the vehicle parking assist apparatus 10.

The displacing button image 57 includes an upward displacing button image 57U, a downward displacing button image 57D, a leftward displacing button image 57L, and a rightward displacing button image 57R. The upward displacing button image 57U is an image to which the driver can apply the touch interaction to displace the parking area line image 52 upward on the display 50. The downward displacing button image 57D is an image to which the driver can apply the touch interaction to displace the parking area line image 52 downward on the display 50. The leftward displacing button image 57L is an image to which the driver can apply the touch interaction to displace the parking area line image 52 leftward on the display 50. The rightward displacing button image 57R is an image to which the driver can apply the touch interaction to displace the parking area line image 52 rightward on the display 50.

The registering button image 55 includes a first registering button image 551, a second registering button image 552, and a third registering button image 553.

The vehicle parking assist apparatus 10 can register or memorize plural sets of parking lot information Ipark by the parking assist control. The parking lot information is information on the parking lot 62 which the vehicle parking assist apparatus 10 uses to autonomously park the vehicle 100 in the parking lot 62. In this embodiment, the vehicle parking assist apparatus 10 can register up to three sets of the parking lot information Ipark. Hereinafter, the three sets of the parking lot information Ipark will be referred to as "the first parking lot information Ipark_1", "the second parking lot information Ipark_2", and "the third parking lot information Ipark_3", respectively.

The first registering button image 551 to the third registering button image 553 are images to which the driver applies the touch interaction to register the parking lot information Ipark acquired by the parking assist control in the vehicle parking assist apparatus 10, respectively. When the driver applies the touch interaction to the first registering button image 551, the parking lot information Ipark is registered in the vehicle parking assist apparatus 10 as the first parking lot information Ipark_1. When the driver applies the touch interaction to the second registering button image 552, the parking lot information Ipark is registered in the vehicle parking assist apparatus 10 as the second parking lot information Ipark_2. When the driver applies the touch interaction to the third registering button image 553, the parking lot information Ipark is registered in the vehicle parking assist apparatus 10 as the third parking lot information Ipark_3.

The information deleting button image 58 is an image to which the driver applies the touch interaction to delete any one of the first parking lot information Ipark_1 to the third parking lot information Ipark_3 registered in the vehicle parking assist apparatus 10 (in particular, the RAM of the ECU 90) by the parking assist control.

The first information deleting button image 591 is an image to which the driver applies the touch interaction to delete the first parking lot information Ipark_1 registered in the vehicle parking assist apparatus 10 (in particular, the RAM of the ECU 90) by the parking assist control. The first information deleting button image 591 displays characters "MEMORY 1."

The second information deleting button image 592 is an image to which the driver applies the touch interaction to delete the second parking lot information Ipark_2 registered in the vehicle parking assist apparatus 10 (in particular, the RAM of the ECU 90) by the parking assist control. The second information deleting button image 592 displays characters "MEMORY 2."

The third information deleting button image 593 is an image to which the driver applies the touch interaction to delete the third parking lot information Ipark_3 registered in the vehicle parking assist apparatus 10 (in particular, the RAM of the ECU 90) by the parking assist control. The third information deleting button image 593 displays characters "MEMORY 3."

<Summary of Operations of Vehicle Parking Assist Apparatus>

Next, a summary of operations of the vehicle parking assist apparatus 10 will be described. The vehicle parking assist apparatus 10 can execute the parking assist control. The parking assist control is a control to autonomously park the vehicle 100 in the parking area 61 without any operations applied to the acceleration pedal 14, the brake pedal 15, and the steering wheel 16 by the driver.

There are parking lots in which the parking areas are partitioned bylines such as white lines. Hereinafter, each of the lines partitioning the parking areas will be referred to as "the parking area line." In the parking lot in which the parking areas are partitioned by the parking area lines, the vehicle parking assist apparatus can use the parking area lines taken by the camera to autonomously park the vehicle in the parking area.

On the other hand, there are the parking lots such as the parking lot of the private house in which the parking areas are not partitioned by the parking area lines. In the parking lot in which the parking areas are not partitioned by the parking area lines, there are not the parking area lines which the vehicle parking assist apparatus uses to autonomously park the vehicle 100 in the parking area. The parking assist control which the vehicle parking assist apparatus 10 executes, includes (i) a control to autonomously park the vehicle in the parking lot and register the parking lot information on the parking lot in which the vehicle has been parked and (ii) a control to autonomously park the vehicle in the parking lot registered by the parking lot information.

When the vehicle moving speed SPD becomes equal to or smaller than a predetermined vehicle moving speed SPDth, the vehicle parking assist apparatus 10 starts to execute a searching process to search the camera image CMR to find image parts having the same luminance patterns as the luminance patterns of registration entrance feature points Fent_eg. The vehicle parking assist apparatus 10 executes the searching process, using the left image information IMG3 and the right image information IMG4. As described later in detail, the registration entrance feature points Fent_reg are entrance feature points Fent having the luminance patterns registered or memorized in the vehicle parking assist apparatus 10 by registration entrance luminance pattern information CTent_eg registered by the parking assist control. The entrance feature points Fent are the feature points F in the camera image CMR of the entrance 62ent of the parking lot 62 acquired by the parking assist control. The registration entrance luminance pattern information CTent_reg is the luminance pattern information CT on the registration entrance feature points Fent_reg. The camera image CMR is the image taken and acquired by the cameras 45.

When the vehicle parking assist apparatus 10 finds the image parts in the camera image CMR, the vehicle parking assist apparatus 10 compares or matches a relationship in position between the found image parts with a relationship in position between the registration entrance feature points Fent_reg having the luminance patterns corresponding to the luminance patterns of the found image parts.

When the relationship in position between the found image parts matches the relationship in position between the registration entrance feature points Fent_reg having the luminance patterns corresponding to the luminance patterns of the found image parts, the vehicle parking assist apparatus 10 determines that the registered parking lot 62 exists by the vehicle 100. The registered parking lot 62 is the parking lot registered or memorized in the vehicle parking assist apparatus 10 by parking lot information Ipark registered by the parking assist control.

In particular, when the relationship in position between the image parts found, based on the left image information IMG3 matches the relationship in position between the registration entrance feature points Fent_reg having the luminance patterns corresponding to the luminance patterns of the found image parts, the vehicle parking assist apparatus 10 determines that the registered parking lot 62 exists at the left side of the vehicle 100.

On the other hand, when the relationship in position between the image parts found, based on the right image information IMG4 matches the relationship in position between the registration entrance feature points Fent_reg having the luminance patterns corresponding to the luminance patterns of the found image parts, the vehicle parking assist apparatus 10 determines that the registered parking lot 62 exists at the right side of the vehicle 100.

When the vehicle parking assist apparatus 10 does not find the image parts in the camera image CMR, the vehicle parking assist apparatus 10 determines that the registered parking lot 62 does not exist by the vehicle 100. Also, when the relationship in position between the found image parts does not match the relationship in position between the registration entrance feature points Fent_reg having the luminance patterns corresponding to the luminance patterns of the found image parts, the vehicle parking assist apparatus 10 determines that the registered parking lot 62 does not exist by the vehicle 100.

Further, when the vehicle parking assist apparatus 10 determines that the registered parking lot 62 does not exist by the vehicle 100, the vehicle parking assist apparatus 10 determines whether the non-registered parking lot 62 exists by the vehicle 100 by using the sonar information SON and the image information IMG. In particular, the vehicle parking assist apparatus 10 determines whether the non-registered parking lot 62 exists at the left or right side of the vehicle 100 by using the sonar information SON and the image information IMG. The non-registered parking lot 62 is the parking lot, the information on which is not registered as the parking lot information Ipark in the vehicle parking assist apparatus 10.

When (i) the vehicle parking assist apparatus 10 determines that the non-registered parking lot 62 exists by the vehicle 100, and (n) the vehicle 100 stops by the entrance 62ent of the non-registered parking lot 62, the vehicle parking assist apparatus 10 determines that the vehicle 100 stops by the entrance 62ent of the non-registered parking lot 62.

<Parking Vehicle in Non-Registered Parking Lot>

Figure 9A:
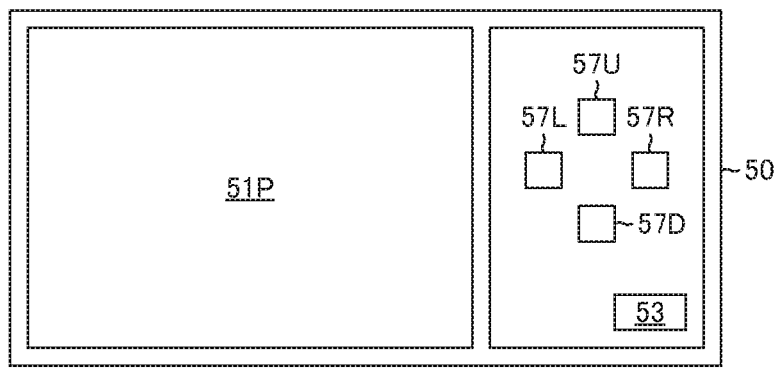
FIG. 9A to FIG. 9D are views which show displays.

When the vehicle parking assist apparatus 10 determines that the vehicle 100 stops by the entrance 62*ent* of the parking lot 62, the vehicle parking assist apparatus 10 acquires preliminary entrance information Ient_pre and preliminary midway information Imid_pre as described below. In addition, the vehicle parking assist apparatus 10 registers or memorizes ( ) registration entrance information Ient_reg, (ii) registration inside information Iin_reg, and (iii) registration area information Iarea_reg as the parking lot information Ipark as described below. When the vehicle parking assist apparatus 10 determines that the vehicle 100 stops by the entrance 62*ent* of the non-registered parking lot 62, the vehicle parking assist apparatus 10 displays the plane view image 51P, the parking area line image 52, the setting button image 53, and the displacing button image 57 on the display 50 as shown in FIG. 9A. In addition, when the non-registered parking lot 62 exists at the left side of the vehicle 100, the vehicle parking assist apparatus 10 displays the plane view image 51P on the display 50 such that a parking lot image is displayed at the left side of a vehicle image. On the other hand, when the non-registered parking lot 62 exists at the right side of the vehicle 100, the vehicle parking assist apparatus 10 displays the plane view image 51P on the display 50 such that the parking lot image is displayed at the right side of the vehicle image.

In addition, the vehicle parking assist apparatus 10 sets the parking area 61 to an area in which the vehicle 100 can be parked, based on the image information IMG and the sonar information SON. Then, the vehicle parking assist apparatus 10 displays the set parking area 61 on the display 50 by the parking area line image 52. The vehicle parking assist apparatus 10 uses, for example, the sonar information SON to acquire a size of the entrance 62*ent* of the parking lot 62.

The driver can displace the parking area line image 52 on the display 50 by applying the touch interaction to the displacing button image 57 before the driver applies the touch interaction to the setting button image 53. The driver can change a position of the parking area 61 to a position in which the driver desires to park the vehicle 100 by displacing the parking area line image 52 on the display 50.

Figure 9B:
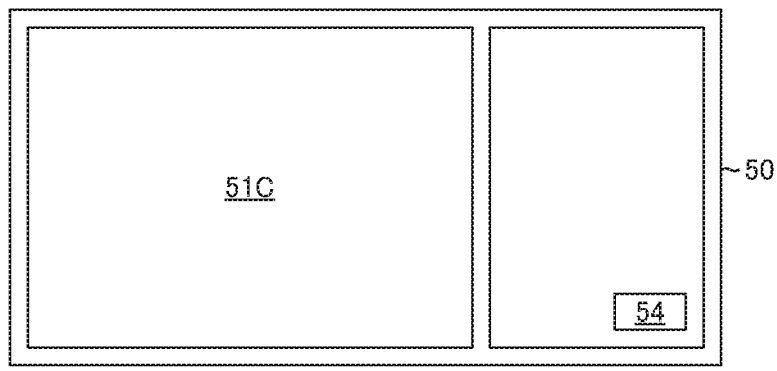

When the driver applies the touch interaction to the setting button image 53, the vehicle parking assist apparatus 10 terminates displaying the setting button image 53 and the displacing button image 57 on the display 50 and displays the registration start button image 54 on the display 50 as shown in FIG. 9B.

In addition, when the driver applies the touch interaction to the setting button image 53, the vehicle parking assist apparatus 10 acquires the position of the parking area 61 corresponding to the position of the parking area line image 52 displayed on the display 50. Then, the vehicle parking assist apparatus 10 sets the parking area 61 of the acquired position as a registration target parking area 61*set*.

Figure 10:
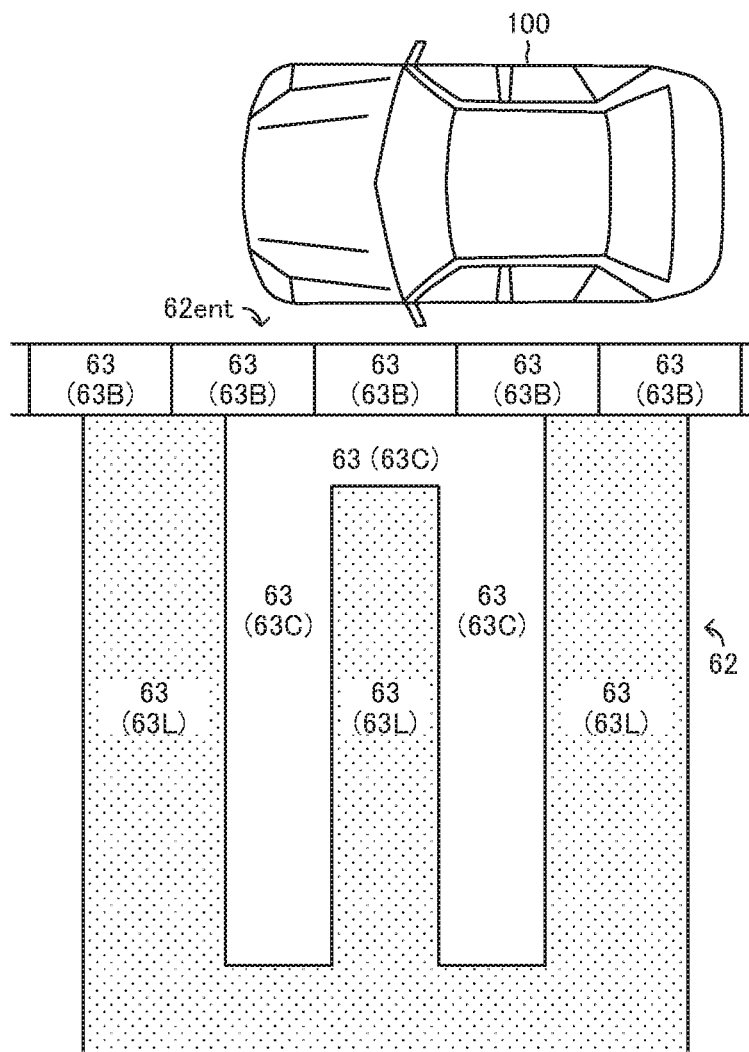
FIG. 10 is a view used for describing operations of the vehicle parking assist apparatus according to the embodiment of the invention.
Figure 11:
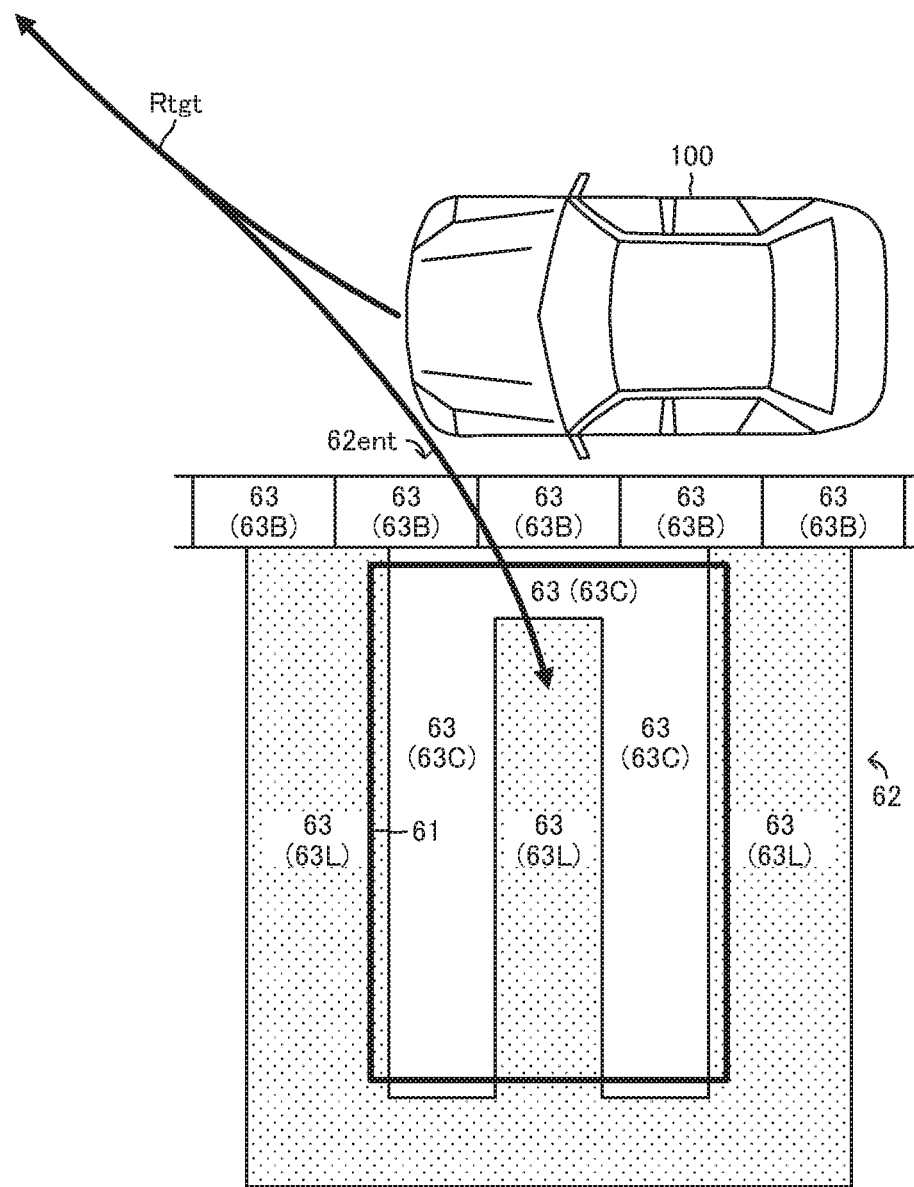
FIG. 11 is a view used for describing the operations of the vehicle parking assist apparatus according to the embodiment of the invention.
Figure 12:
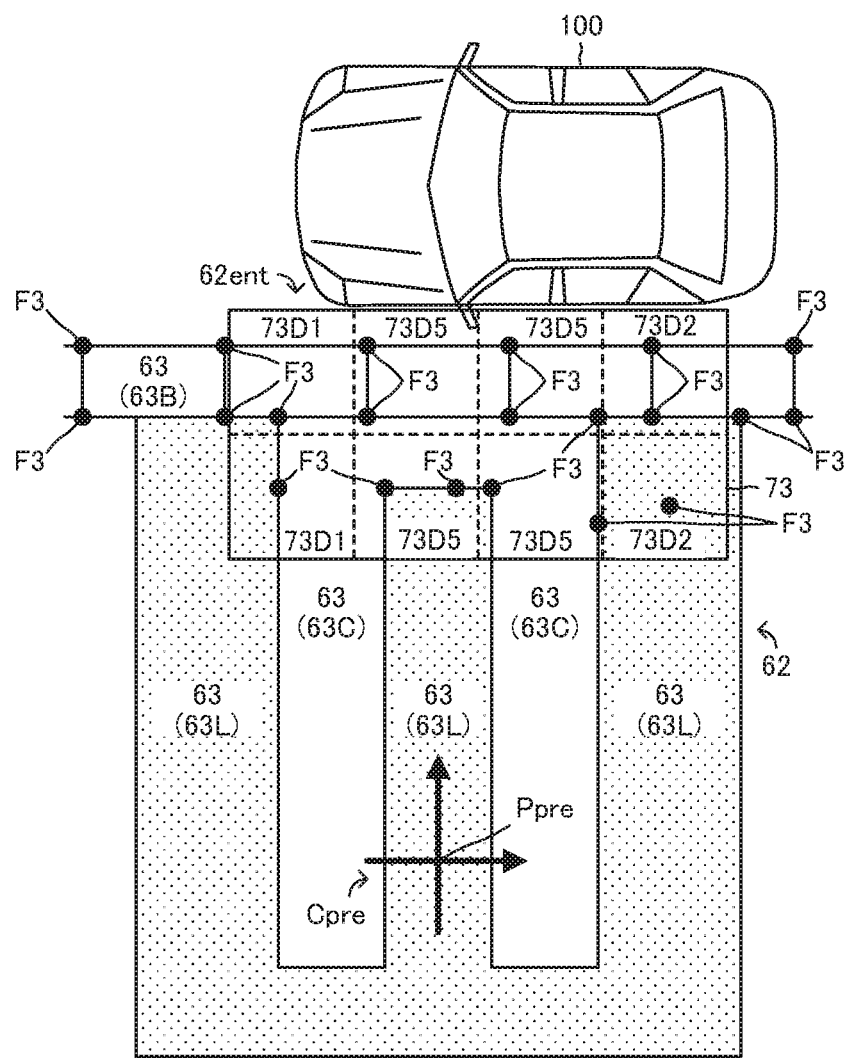
FIG. 12 is a view used for describing the operations of the vehicle parking assist apparatus according to the embodiment of the invention.

In addition, when the driver applies the touch interaction to the setting button image 53, the vehicle parking assist apparatus 10 sets a target moving route Rtgt to move the vehicle 100 to park the vehicle 100 in the registration target parking area 61*set*. For example, when the vehicle 100 stops at the right side of the non-registered parking lot 62 as shown in FIG. 10, the vehicle parking assist apparatus 10 sets the target moving mute Rtgt as shown in FIG. 11.

In addition, when (i) the vehicle 100 stops at the right side of the parking lot 62, and (ii) the driver applies the touch interaction to the setting button image 53, the vehicle parking assist apparatus 10 acquires a predetermined one or more number of the new left feature point(s) F3*new* in each of the four middle divided areas 73D5, the two front end divided areas 73D1, and the two rear end divided areas 73D2 of the left area 73. At this time, the vehicle parking assist apparatus 10 acquires the new left feature points F3*new* as the entrance feature points Fent. On the other hand, when (i) the vehicle 100 stops at the left side of the parking lot 62, and (ii) the driver applies the touch interaction to the setting button image 53, the vehicle parking assist apparatus 10 acquires the predetermined one or more number of the new right feature point(s) F4*new* in each of the four middle divided areas 74D5, the two front end divided areas 7401, and the two rear end divided areas 74D2 of the right area 74. At this time, the vehicle parking assist apparatus 10 acquires the new right feature points F4*new* as the entrance feature points Fent.

In this embodiment, when (i) the vehicle 100 stops at the right side of the parking lot 62, and (ii) the driver applies the touch interaction to the setting button image 53, the vehicle parking assist apparatus 10 acquires the entrance feature points Fent such that the number of the entrance feature points Fent acquired at each of the middle divided areas 73D5 is larger than the number of the entrance feature points Fent acquired at each of the front end divided areas 73D1 and the rear end divided areas 73D2. Basically, the vehicle parking assist apparatus 10 acquires the entrance feature points Fent such that the number of the entrance feature points Fent acquired at each of the areas 7305 near a center of the entrance 62*ent* of the parking lot 62 is larger than the number of the entrance feature points Fent acquired at each of the areas 73D1 and 73D2 away from the center of the entrance 62*ent* of the parking lot 62.

On the other hand, when (i) the vehicle 100 stops at the left side of the parking lot 62, and (ii) the driver applies the touch interaction to the setting button image 53, the vehicle parking assist apparatus 10 acquires the entrance feature points Fent such that the number of the entrance feature points Fent acquired at each of the middle divided areas 74D5 is larger than the number of the entrance feature points Fent acquired at each of the front end divided areas 74D1 and the rear end divided areas 74D2. Basically, the vehicle parking assist apparatus 10 acquires the entrance feature points Fent such that the number of the entrance feature points Fent acquired at each of the areas 74D5 near the center of the entrance 62*ent* of the parking lot 62 is larger than the number of the entrance feature points Fent acquired at each of the areas 74D1 and 74D2 away from the center of the entrance 62*ent* of the parking lot 62.

Figure 13:
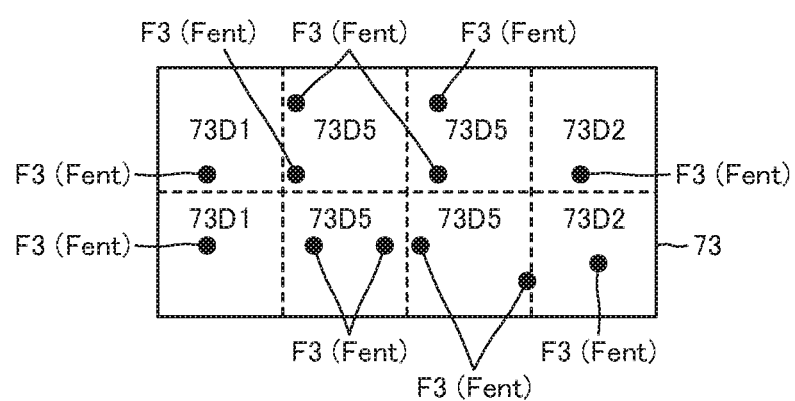
FIG. 13 is a view which shows entrance feature points.
Figure 14:
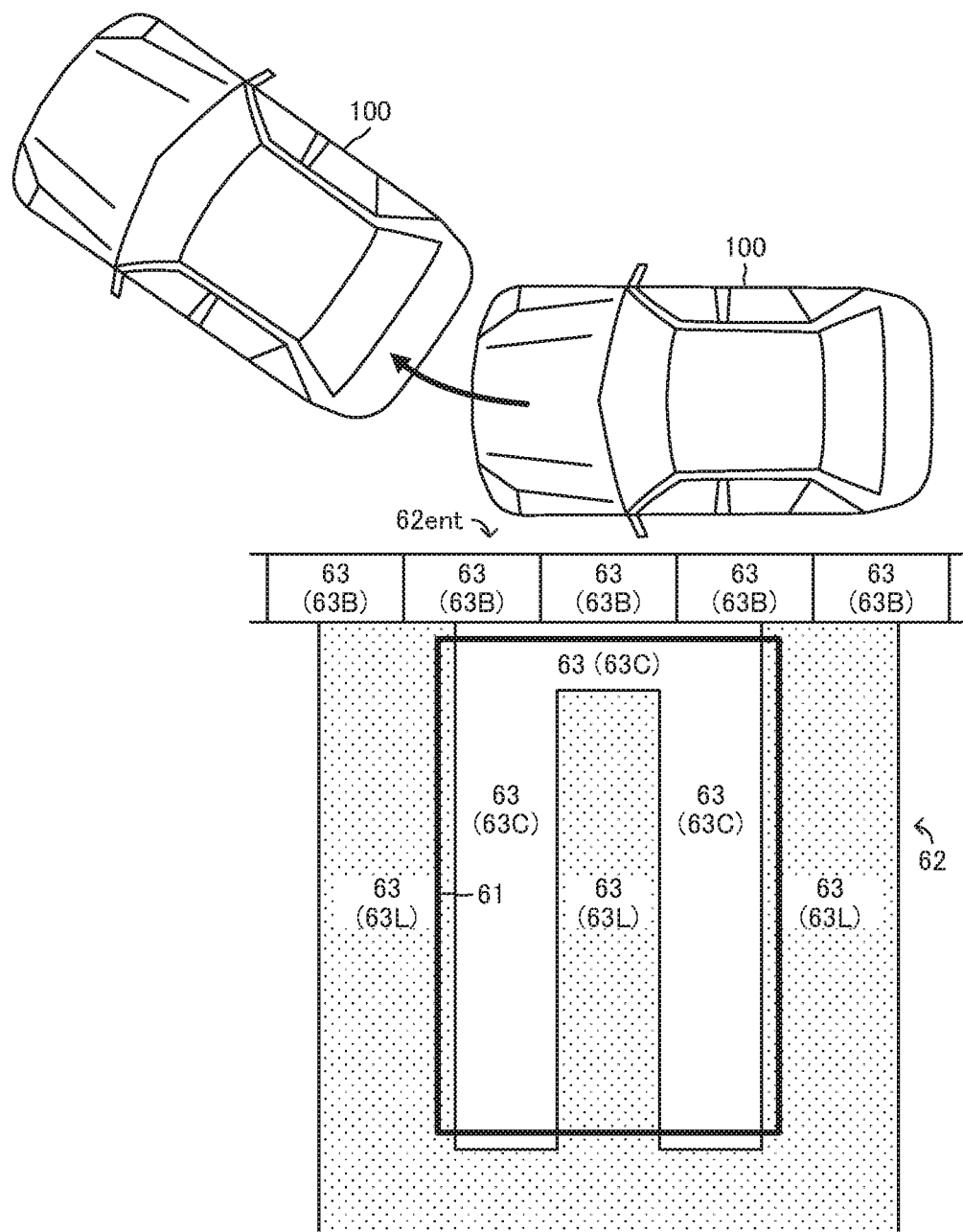
FIG. 14 is a view used for describing the operations of the vehicle parking assist apparatus according to the embodiment of the invention.

For example, when the vehicle 100 stops at the right side of the parking lot 62 as shown in FIG. 10, the vehicle parking assist apparatus 10 acquires (i) the two new left feature points F3*new* as the entrance feature points Fent from each of the four middle divided areas 73D5 of the left area 73, (ii) the one new left feature point F3*new* as the entrance feature point Fent from each of the two front end divided areas 73D1 of the left area 73, and (iii) the one new left feature point F3*new* as the entrance feature point Fent from each of the two rear end divided areas 73D2 of the left area 73 (see FIG. 13 and FIG. 14). On the other hand, when the vehicle 100 stops at the left side of the parking lot 62, the vehicle parking assist apparatus 10 acquires (i) the two new right feature points F4*new* as the entrance feature points Fent from each of the four middle divided areas 74D5 of the right area 74, (ii) the one new left feature point F4*new* as the entrance feature point Fent from each of the two front end divided areas 74D1 of the right area 74, and (iii) the one new left feature point F4*new* as the entrance feature point Fent from each of the two rear end divided areas 74D2 of the right area 74.

It should be noted that the vehicle parking assist apparatus 10 may be configured to acquire the entrance feature points Fent such that the number of the entrance feature points Fent acquired from each of the two front end divided areas 73D1 and the two middle divided areas 73D5 adjacent to the front end divided areas 73D1 is larger than the number of the entrance feature points Fent acquired from each of the two rear end divided areas 73D2 and the two middle divided areas 73D5 adjacent to the rear end divided areas 73D2 when the driver tends to stop the vehicle 100 at the right side of the entrance 62*ent* of the parking lot 62 and slightly before a position immediately lateral to the entrance 62*ent* of the parking lot 62. Similarly, the vehicle parking assist apparatus 10 may be configured to acquire the entrance feature points Fent such that the number of the entrance feature points Fent acquired from each of the two front end divided areas 74D1 and the two middle divided areas 74D5 adjacent to the front end divided areas 74D1 is larger than the number of the entrance feature points Fent acquired from each of the two rear end divided areas 74D2 and the two middle divided areas 74D5 adjacent to the rear end divided areas 74D2 when the driver tends to stop the vehicle 100 at the left side of the entrance 62*ent* of the parking lot 62 and slightly before the position immediately lateral to the entrance 62*ent* of the parking lot 62.

When the vehicle parking assist apparatus 10 cannot acquire the predetermined number of the new left feature points F3*new* from at least one of the middle divided areas 73D5, the front end divided areas 73D1, and the rear end divided areas 73D2 of the left area 73, the vehicle parking assist apparatus 10 acquires the entrance feature points Fent from the remaining of the middle divided areas 7305, the front end divided areas 73D1, and the rear end divided areas 73D2 to compensate a shortfall of the number of the acquired entrance feature points Fent. Similarly, when the vehicle parking assist apparatus 10 cannot acquire the predetermined number of the new right feature points F4*new* from at least one of the middle divided areas 74D5, the front end divided areas 74D1, and the rear end divided areas 74D2 of the right area 74, the vehicle parking assist apparatus 10 acquires the entrance feature points Fent from the remaining of the middle divided areas 74D5, the front end divided areas 74D1, and the rear end divided areas 74D2 to compensate the shortfall of the number of the acquired entrance feature points Fent.

After the vehicle parking assist apparatus 10 acquires the entrance feature points Fent, the vehicle parking assist apparatus 10 acquires coordinates XY of each of the acquired entrance feature points Fent in a preliminary coordinate system Cpre and memorizes the acquired coordinates XY as preliminary entrance coordinates XYent_pre. In addition, the vehicle parking assist apparatus 10 acquires the luminance pattern information CT on each of the acquired entrance feature points Fent and memorizes the acquired luminance pattern information CT as preliminary entrance luminance pattern information CTent_pre. The preliminary coordinate system Cpre is a coordinate system in which a predetermined point Ppre in the registration target parking area 61*set* is the origin. Therefore, the preliminary entrance coordinates XYent_pre indicates a position of the entrance feature point Fent relative to the predetermined position Ppre. The preliminary entrance information Ient_pre includes the preliminary entrance coordinates XYent_pre and the preliminary entrance luminance pattern information CTent_pre.

Figure 9C:
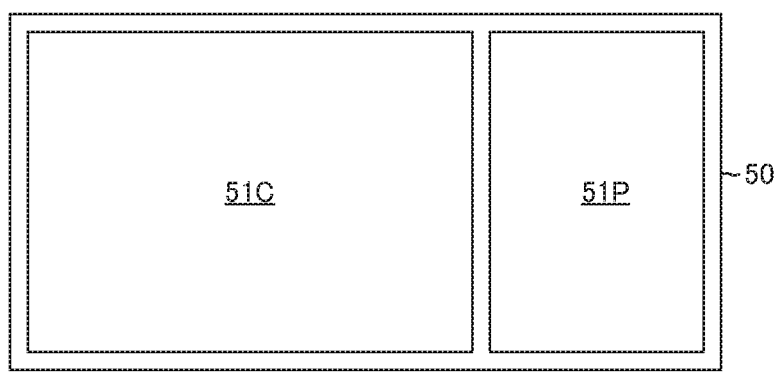

When the driver applies the touch interaction to the registration start button image 54, the vehicle parking assist apparatus 10 displays the camera image 51C and the plane view image 51P on the display 50 as shown in FIG. 9C. In this case, when the non-registered parking lot 62 exists at the left side of the vehicle 100, the vehicle parking assist apparatus 10 acquires the image displaying the non-registered parking lot 62 from the left camera 43 and displays the acquired image on the display 50 as the camera image 51C. In addition, the vehicle parking assist apparatus 10 displays the plane view image 51P on the display 50 such that the parking lot image is displayed at the left side of the vehicle image. On the other hand, when the non-registered parking lot 62 exists at the right side of the vehicle 100, the vehicle parking assist apparatus 10 acquires the image displaying the non-registered parking lot 62 from the right camera 44 and displays the acquired image on the display 50 as the camera image 51C. In addition, the vehicle parking assist apparatus 10 displays the plane view image 51P on the display 50 such that the parking lot image is displayed at the right side of the vehicle image.

In addition, when the driver applies the touch interaction to the registration start button image 54, the vehicle parking assist apparatus 10 starts to execute the first parking moving process to move the vehicle 100 to the registration target parking area 61*set* along the target moving route Rtgt. The first parking moving process is a process to control the operations of the vehicle driving force generation apparatus 11, the brake apparatus 12, and the steering apparatus 13 to move the vehicle 100 along the target moving route Rtgt, based on (i) the image information IMG, (ii) the object information OBJ, (iii) the steering angle θst, (iv) the steering torque TQst, (v) the vehicle moving speed SPD, (vi) the vehicle yaw rate YR, (vii) the vehicle longitudinal acceleration Gx, and (viii) the vehicle lateral acceleration Gy.

Figure 15:
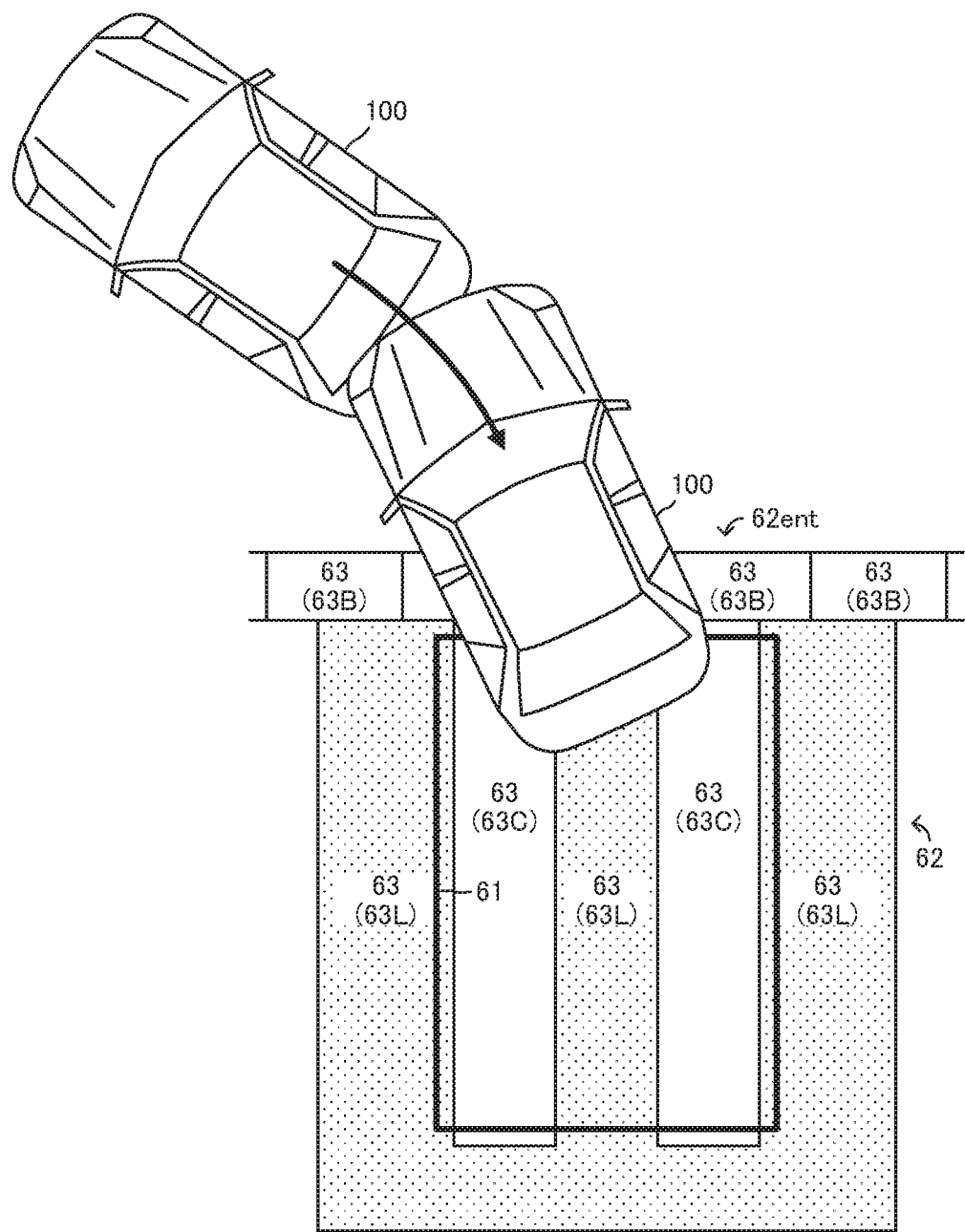
FIG. 15 is a view used for describing the operations of the vehicle parking assist apparatus according to the embodiment of the invention.

For example, when the vehicle 100 stops at the right side of the non-registered parking lot 62 as shown in FIG. 10, the vehicle parking assist apparatus 10 starts to execute the first parking moving process to move the vehicle 100 forward right and stops the vehicle 100 as shown in FIG. 14. Then, the vehicle parking assist apparatus 10 moves the vehicle 100 rearward left as shown in FIG. 15.

The vehicle parking assist apparatus 10 acquires the feature points F at least once before or when the vehicle parking assist apparatus 10 completes parking the vehicle 100 in the parking lot 62 by the parking assist control. Then, the vehicle parking assist apparatus 10 acquires the coordinates XY of the acquired feature points F in the preliminary coordinate system Cpre and the luminance pattern information CT on the acquired feature points F. In particular, after the vehicle parking assist apparatus 10 starts to move the vehicle 100 in order to park the vehicle 100 in the parking lot 62, the vehicle parking assist apparatus 10 acquires the feature points F at least once when the vehicle parking assist apparatus 10 predicts that the vehicle 100 continues moving straight without turning until the vehicle parking assist apparatus 10 completes parking the vehicle 100 in the parking lot 62 by the parking assist control. Then, the vehicle parking assist apparatus 10 acquires the coordinates XY of the acquired feature points F in the preliminary coordinate system Cpre and the luminance pattern information CT on the acquired feature points F.

Figure 16:
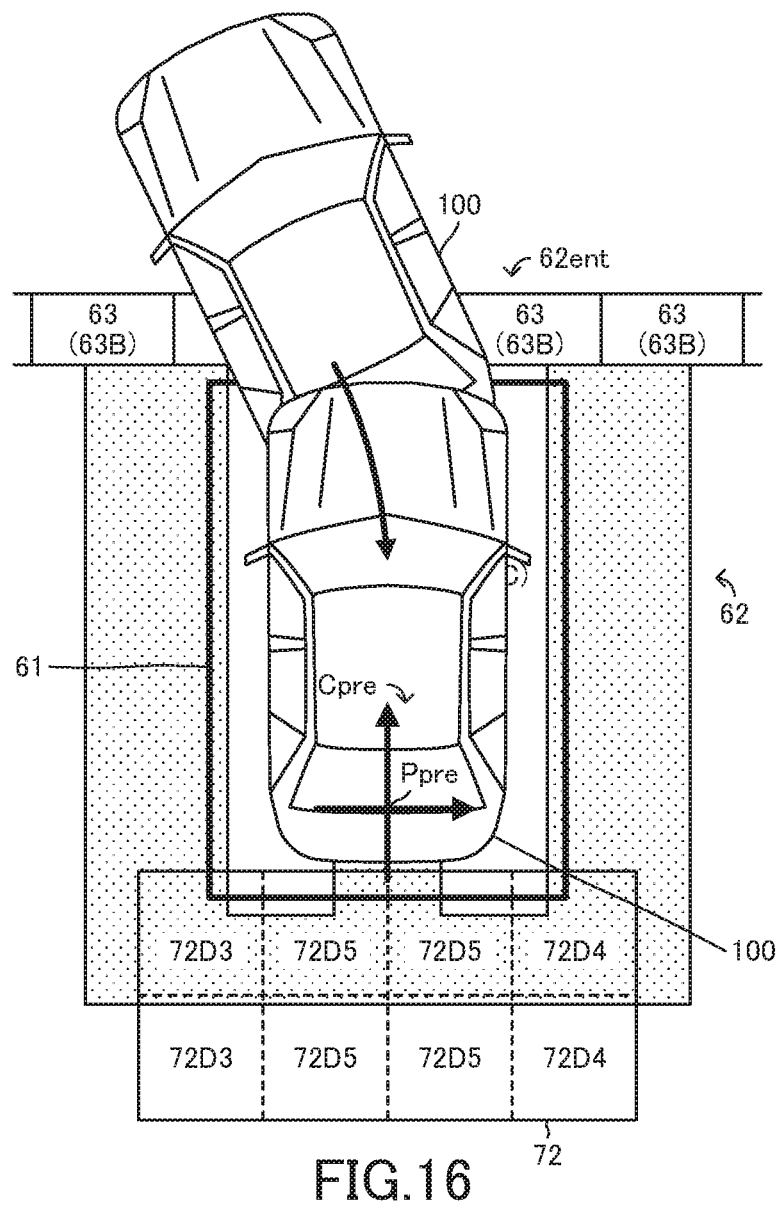
FIG. 16 is a view used for describing the operations of the vehicle parking assist apparatus according to the embodiment of the invention.

In this embodiment, the vehicle parking assist apparatus 10 acquires the rear feature points F2 as new rear feature points F2*new* when the vehicle parking assist apparatus 10 predicts that the vehicle 100 continues moving rearward straight without turning until the vehicle parking assist apparatus 10 completes parking the vehicle 100 in the parking lot 62 by the parking assist control (see FIG. 16). It should be noted that the vehicle parking assist apparatus 10 may acquire the rear feature points F2 when the vehicle 100 moves a predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire (i) the rear feature points F2 when the vehicle parking assist apparatus 10 predicts that the vehicle 100 continues moving rearward straight without turning until the vehicle parking assist apparatus 10 completes parking the vehicle 100 in the parking lot 62 by the parking assist control and (ii) the rear feature points F2 when the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire (i) the rear feature points F2 when the vehicle parking assist apparatus 10 predicts that the vehicle 100 continues moving rearward straight without turning until the vehicle parking assist apparatus 10 completes parking the vehicle 100 in the parking lot 62 by the parking assist control and (ii) the rear feature points F2 each time the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Alternatively, the vehicle parking assist apparatus 10 may acquire the rear feature points F2 each time the vehicle 100 moves the predetermined distance Dtravel_th after the vehicle parking assist apparatus 10 predicts that the vehicle 100 continues moving rearward straight without turning until the vehicle parking assist apparatus 10 completes parking the vehicle 100 in the parking lot 62 by the parking assist control. Further, the vehicle parking assist apparatus 10 may acquire the front feature points F1, the left feature points F3 and/or the right feature points F4 in addition to the rear feature points F2.

In this embodiment, the predetermined distance Dtravel_th is set to a distance which can prevent an area of the parking lot 62 corresponding to the rear area 72 at the time of the rear feature points F2 being acquired this time from overlapping the area of the parking lot 62 corresponding to the rear area 72 at the time of the rear feature points F2 being acquired last time.

Then, the vehicle parking assist apparatus 10 acquires one or more of the new rear feature points F2*new* from each of the rear divided areas 72D and sets the acquired new rear feature points F2*new* as midway feature points Fmid. Then, the vehicle parking assist apparatus 10 acquires the coordinates XY of the acquired midway feature points Fmid in the preliminary coordinate system Cpre and memorizes the acquired coordinates XY as preliminary midway coordinates XYmid_pre. In addition, the vehicle parking assist apparatus 10 acquires the luminance pattern information CT on the acquired midway feature points Fmid and memorizes the acquired luminance pattern information CT as preliminary midway luminance pattern information CTmid_pre. The preliminary midway coordinates XYmid_pre indicate positions of the midway feature points Fmid relative to the predetermined position Ppre. The preliminary midway information Imid_pre includes the preliminary midway coordinates XYmid_pre and the preliminary midway luminance pattern information CTmid_pre.

Further, while the vehicle parking assist apparatus 10 executes the first parking moving process to move the vehicle 100 along the target moving route Rtgt, the vehicle parking assist apparatus 10 executes a safety determination process to determine whether the vehicle parking assist apparatus 10 can move the vehicle 100 safely to the registration target parking area 61*set*, preventing the vehicle 100 from contacting to the standing object in the parking lot 62. When the vehicle parking assist apparatus 10 determines that the vehicle parking assist apparatus 10 cannot move the vehicle 100 safely to the registration target parking area 61*set*, the vehicle parking assist apparatus 10 corrects the target moving route Rtgt such that the vehicle parking assist apparatus 10 can move the vehicle 100 safely to the registration target parking area 61*set*, preventing the vehicle 100 from contacting to the standing object in the parking lot 62. The vehicle parking assist apparatus 10 executes the safety determination process, based on the image information IMG and the object information OBJ which the vehicle parking assist apparatus 10 acquires during the first parking moving process.

In addition, while the vehicle parking assist apparatus 10 executes the first parking moving process to move the vehicle 100 along the target moving route Rtgt, the vehicle parking assist apparatus 10 executes a route determination process to determine whether the vehicle parking assist apparatus 10 can park the vehicle 100 in the registration target parking area 61*set*. When the vehicle parking assist apparatus 10 determines that the vehicle parking assist apparatus 10 cannot park the vehicle 100 in the registration target parking area 61*set*, the vehicle parking assist apparatus 10 corrects the target moving route Rtgt such that the vehicle parking assist apparatus 10 can park the vehicle 100 in the registration target parking area 61*set*. The vehicle parking assist apparatus 10 executes the route determination process, based on the image information IMG (in particular, the feature points F) which the vehicle parking assist apparatus 10 acquires during the first parking moving process.

Figure 17:
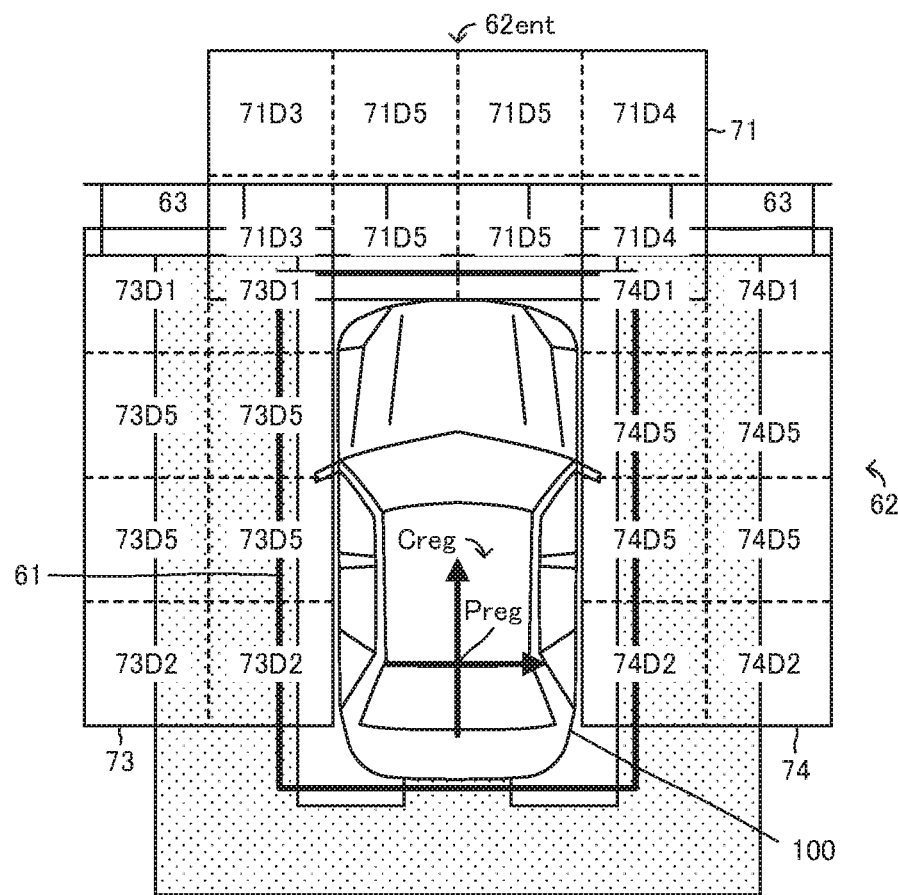
FIG. 17 is a view used for describing the operations of the vehicle parking assist apparatus according to the embodiment of the invention.

When the entire vehicle 100 has moved in the registration target parking area 61*set* (see FIG. 17), the vehicle parking assist apparatus 10 stops the vehicle 100 and terminates executing the first parking moving process. Thereby, parking the vehicle 100 in the parking lot 62 by the parking assist control is completed. At this time, the vehicle parking assist apparatus 10 acquires the front feature points F1, the left feature points F3, and the right feature points F4 as new front feature points F1*new*, new left feature points F3*new*, and new right feature points F4*new*, respectively. At this time, the vehicle parking assist apparatus 10 may acquire the rear feature points F2 as new rear feature points F2*new*.

Then, the vehicle parking assist apparatus 10 acquires one or more of the acquired new front feature points F1*new* from each of the front divided areas 71D as final feature points Ffin. In addition, the vehicle parking assist apparatus 10 acquires one or more of the acquired new left feature points F3*new* from each of the left divided areas 73D as the final feature points Ffin. In addition, the vehicle parking assist apparatus 10 acquires one or more of the acquired new right feature points F4*new* from each of the right divided areas 74D as the final feature points Ffin. If the vehicle parking assist apparatus 10 has acquired the new rear feature points F2*new*, the vehicle parking assist apparatus 10 acquires one or more of the acquired new rear feature points F2*new* from each of the rear divided areas 72D as the final feature points Ffin.

In addition, when the driver applies the touch interaction to the registering button image 55, the vehicle parking assist apparatus 10 acquires the coordinates XY of the acquired final feature points Ffin in a registration coordinate system as registration inside coordinates XYin_reg. In addition, the vehicle parking assist apparatus 10 acquires the luminance pattern information CT of the acquired final feature points Ffin as registration inside luminance pattern information CTin_reg. The registration coordinate system Creg is a coordinate system in which a predetermined point Preg is the origin (see FIG. 17). The vehicle 100 includes a shaft connecting a left rear wheel and a right rear wheel to each other. The predetermined point Preg is a center point of the shaft in the vehicle lateral direction Dy when parking the vehicle 100 in the registration target parking area 61*set* by the parking assist control is completed. Therefore, the registration inside coordinates XYin_reg indicate the positions of the final feature points Ffin relative to the predetermined position Preg.

In addition, the vehicle parking assist apparatus 10 converts the preliminary midway coordinates XYmid_pre to the coordinates XY in the registration coordinate system Creg as the registration inside coordinates XYin_reg. In addition, the vehicle parking assist apparatus 10 acquires the preliminary midway luminance pattern information CTmid_pre as the registration inside luminance pattern information CTin_reg. Therefore, the registration inside coordinates XYin_reg indicate the positions of the midway feature points Fmid relative to the predetermined position Preg.

In addition, the vehicle parking assist apparatus 10 converts the preliminary entrance coordinates XYent_pre to the coordinates XY in the registration coordinate system Creg and acquires the converted coordinates XY as registration entrance coordinates XYent_reg. In addition, the vehicle parking assist apparatus 10 acquires the preliminary entrance luminance pattern information CTent_pre as the registration entrance luminance pattern information CTent_reg. Therefore, the registration entrance coordinates XYent_reg indicate the positions of the entrance feature points Fent relative to the predetermined position Preg.

Figure 9D:
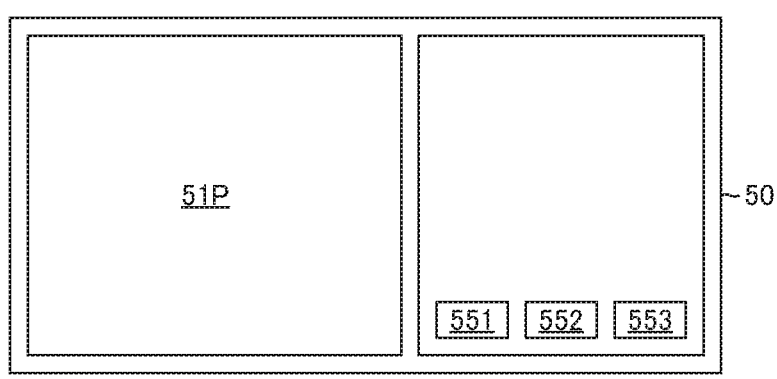

In addition, when the vehicle parking assist apparatus 10 completes parking the vehicle 100 in the parking lot 62 by the parking assist control, the vehicle parking assist apparatus 10 displays the first registering button image 551 to the third registering button image 553 on the display 50 as shown in FIG. 9D.

When the driver applies the touch interaction to the first registering button image 551, the vehicle parking assist apparatus 10 registers the acquired registration inside coordinates XYin_reg, the acquired registration inside luminance pattern information CTin_reg, the acquired registration entrance coordinates XYent_reg, and the acquired registration entrance luminance pattern information CTent_reg as the first parking lot information Ipark_1. When the driver applies the touch interaction to the second registering button image 552, the vehicle parking assist apparatus 10 registers the acquired registration inside coordinates XYin_reg, the acquired registration inside luminance pattern information CTin_reg, the acquired registration entrance coordinates XYent_reg, and the acquired registration entrance luminance pattern information CTent_reg as the second parking lot information Ipark_2. When the driver applies the touch interaction to the third registering button image 553, the vehicle parking assist apparatus 10 registers the acquired registration inside coordinates XYin_reg, the acquired registration inside luminance pattern information CTin_reg, the acquired registration entrance coordinates XYent_reg, and the acquired registration entrance luminance pattern information CTent_reg as the third parking lot information Ipark_3.

The registration inside information Iin_reg includes the registration inside coordinates XYin_reg and the registration inside luminance pattern information CTin_reg.

In addition, the vehicle parking assist apparatus 10 registers or memorizes the coordinates XY of the registration target parking area 61*set* in the registration coordinate system Creg as registration area coordinates XYarea_reg. The registration area coordinates XYarea_reg indicate the position of the parking area 61 relative to the predetermined position Preg. The registration area information Iarea_reg includes the registration area coordinates XYarea_reg It should be noted that as described above, the parking lot information Ipark includes the registration entrance information Ient_reg, the registration inside information Iin_reg, and the registration area information Iarea_reg.

<Parking Vehicle in Registered Parking Lot>

Figure 18A:
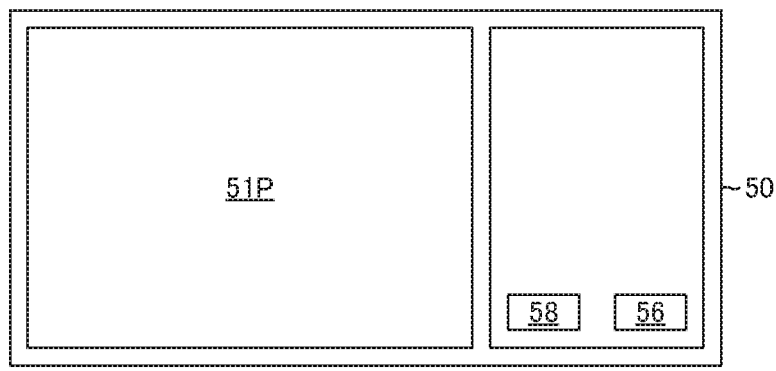
FIG. 18A to FIG. 18D are views which show the displays.

When the vehicle parking assist apparatus 10 determines that the vehicle 100 stops by the entrance 62*ent* of the registered parking lot 62, the vehicle parking assist apparatus 10 displays the camera image 51C, the plane view image 51P, the parking area line image 52, and the parking start button image 56 on the display 50 as shown in FIG. 18A. In this regard, when the registered parking lot 62 exists at the left side of the vehicle 100, the vehicle parking assist apparatus 10 acquires the image displaying the registered parking lot 62 from the left camera 43 and displays the acquired image on the display 50 as the camera image 51C. In addition, the vehicle parking assist apparatus 10 displays the plane view image 51P on the display 50 such that the parking lot image is displayed at the left side of the vehicle image. On the other hand, when the registered parking lot 62 exists at the right side of the vehicle 100, the vehicle parking assist apparatus 10 acquires the image displaying the registered parking lot 62 from the right camera 44 and displays the acquired image on the display 50 as the camera image 51C. In addition, the vehicle parking assist apparatus 10 displays the plane view image 51P on the display 50 such that the parking lot image is displayed at the right side of the vehicle image.

In addition, the vehicle parking assist apparatus 10 fixes the position of the parking area 61, based on the registration area coordinates XYarea_reg included in the parking lot information Ipark relating to the registered parking lot 62 in which the vehicle parking assist apparatus 10 will park the vehicle 100 this time.

Figure 18B:
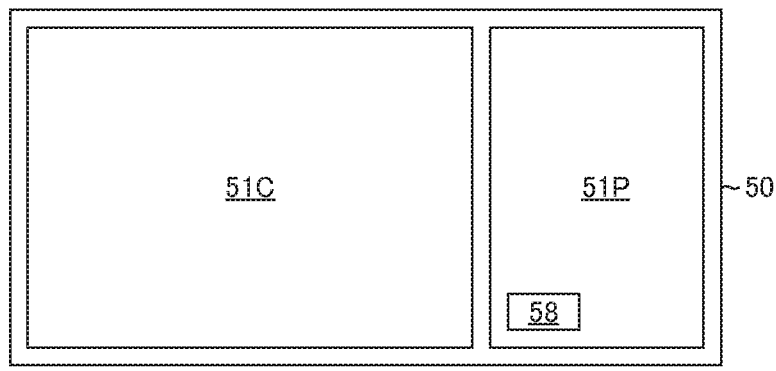

When the driver applies the touch interaction to the parking start button image 56, the vehicle parking assist apparatus 10 terminates displaying the parking start button image 56 on the display 50 as shown in FIG. 18B.

In addition, when the driver applies the touch interaction to the parking start button image 56, the vehicle parking assist apparatus 10 acquires the position of the parking area 61 corresponding to the position of the parking area line image 52 displayed on the display 50. Then, the vehicle parking assist apparatus 10 sets the parking area 61 of the acquired position as a registration target parking area 61*set*.

In addition, when the driver applies the touch interaction to the parking start button image 56, the vehicle parking assist apparatus 10 sets a target moving route Rtgt to move the vehicle 100 to park the vehicle 100 in the registration target parking area 61*set*.

Then, the vehicle parking assist apparatus 10 executes a second parking moving process to move the vehicle 100 to the target parking area 61*tgt* along the target moving route Rtgt. The second parking moving process is a process to control the operations of the vehicle driving force generation apparatus 11, the brake apparatus 12, and the steering apparatus 13 to move the vehicle 100 along the target moving route Rtgt, based on (i) the image information IMG, (ii) the object information OBJ, (iii) the steering angle θst, (iv) the steering torque TQst, (v) the vehicle moving speed SPD, (vi) the vehicle yaw rate YR, (vii) the vehicle longitudinal acceleration Gx, and (viii) the vehicle lateral acceleration Gy.

While the vehicle parking assist apparatus 10 executes the second parking moving process to move the vehicle 100 along the target moving route Rtgt, the vehicle parking assist apparatus 10 executes a safety determination process to determine whether the vehicle parking assist apparatus 10 can move the vehicle 100 safely to the target parking area 61*tgt*, preventing the vehicle 100 from contacting to the standing object in the parking lot 62. When the vehicle parking assist apparatus 10 determines that the vehicle parking assist apparatus 10 cannot move the vehicle 100 safely to the target parking area 61*tgt*, the vehicle parking assist apparatus 10 corrects the target moving route Rtgt such that the vehicle parking assist apparatus 10 can move the vehicle 100 safely to the target parking area 61*tgt*, preventing the vehicle 100 from contacting to the standing object in the parking lot 62. The vehicle parking assist apparatus 10 executes the safety determination process, based on the image information IMG and the object information OBJ which the vehicle parking assist apparatus 10 acquires during the second parking moving process.

While the vehicle parking assist apparatus 10 executes the second parking moving process, the vehicle parking assist apparatus 10 executes a searching process to search the camera image CMR to find image parts having the same luminance patterns as the luminance patterns of the registration feature points Freg. The vehicle parking assist apparatus 10 executes the searching process, using the rear image information IMG2, the left image information IMG3, and the right image information IMG4. The registration feature point Fent is the feature point F having the luminance pattern registered as the registration inside luminance pattern information CTin_reg by the parking assist control.

When the vehicle parking assist apparatus 10 finds the image parts in the camera image CMR, the vehicle parking assist apparatus 10 compares or matches the relationship in position between the found image parts with the relationship in position between the registration feature points Freg having the luminance patterns corresponding to the luminance patterns of the found image parts.

When the relationship in position between the found image parts matches the relationship in position between the registration entrance feature points Fent_reg having the luminance patterns corresponding to the luminance patterns of the found image parts, the vehicle parking assist apparatus 10 executes a parking position determination process to determine whether the position of the target parking area 61*tgt* in the parking lot 62 corresponds to the position indicated by the registration area coordinates XYarea_reg, based on a relationship between the registration area coordinates XYarea_reg and the coordinates XY of the registration feature points Freg having the same luminance patterns as the luminance patterns of the found image parts. When the vehicle parking assist apparatus 10 determines that the position of the target parking area 61*tgt* in the parking lot 62 does not correspond to the position indicated by the registration area coordinates XYarea_reg, the vehicle parking assist apparatus 10 corrects the position of the target parking area 61*tgt* such that the position of the target parking area 61*tgt* in the parking lot 62 corresponds to the position indicated by the registration area coordinates XYarea_reg. Then, the vehicle parking assist apparatus 10 corrects the target moving route Rtgt such that the vehicle parking assist apparatus 10 can park the vehicle 100 in the target parking area 61*tgt* having the corrected position.

When the entire vehicle 100 has moved in the target parking area 61*tgt*, the vehicle parking assist apparatus 10 stops the vehicle 100 and terminates executing the second parking moving process. Thereby, parking the vehicle 100 in the parking lot 62 by the parking assist control is completed.

<Deletion of Parking Lot Information>

When the vehicle parking assist apparatus 10 determines that the vehicle 100 stops by the entrance 62*ent* of the non-registered parking lot 62, the vehicle parking assist apparatus 10 displays the information deleting button image 58 in addition to the parking start button image 56, etc. on the display 50 as shown in FIG. 18A. After the driver applies the touch interaction to the parking start button image 56, the vehicle parking assist apparatus 10 continues displaying the information deleting button image 58 on the display 50 as shown in FIG. 18B.

If the vehicle parking assist apparatus 10 deletes the parking lot information Ipark on the parking lot 62 in which the vehicle parking assist apparatus 10 parks the vehicle 100 as the vehicle parking assist apparatus 10 executes the second parking moving process, the vehicle parking assist apparatus 10 cannot park the vehicle 100 accurately in the target parking area 61*tgt*. Therefore, the vehicle parking assist apparatus 10 may stop executing the second parking moving process.

Figure 18C:
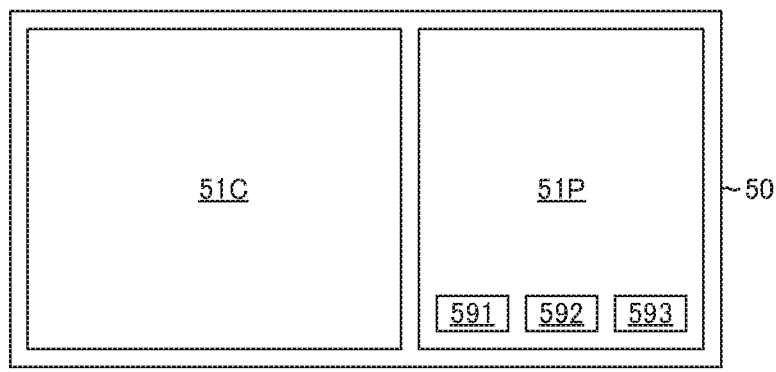

The vehicle parking assist apparatus 10 displays the first information deleting button image 591, the second information deleting button image 592, and the third information deleting button image 593 on the display 50 as shown in FIG. 18C when the driver applies the touch interaction to the information deleting button image 58 before the vehicle parking assist apparatus 10 starts to execute the second parking moving process. When the driver applies the touch interaction to the first information deleting button image 591 before the vehicle parking assist apparatus 10 starts to execute the second parking moving process, the vehicle parking assist apparatus 10 deletes the first parking lot information Ipark_1. Similarly, when the driver applies the touch interaction to the second information deleting button image 592 before the vehicle parking assist apparatus 10 starts to execute the second parking moving process, the vehicle parking assist apparatus 10 deletes the second parking lot information Ipark_2. Similarly, when the driver applies the touch interaction to the third information deleting button image 593 before the vehicle parking assist apparatus 10 starts to execute the second parking moving process, the vehicle parking assist apparatus 10 deletes the third parking lot information Ipark_3.

On the other hand, when the driver applies the touch interaction to the information deleting button image 58 after the vehicle parking assist apparatus 10 starts to execute the second parking moving process, the vehicle parking assist apparatus 10 does not display any one of the first information deleting button image 591, the second information deleting button image 592, and the third information deleting button image 593 on the display 50 corresponding to the parking lot information Ipark on the parking lot 62 in which the vehicle parking assist apparatus 10 parks the vehicle 100 by the second parking moving process this time. In this case, the vehicle parking assist apparatus 10 displays the remaining of the first information deleting button image 591, the second information deleting button image 592, and the third information deleting button image 593 on the display 50. Hereinafter, the parking lot information Ipark on the parking lot 62 in which the vehicle parking assist apparatus 10 parks the vehicle 100 by the second parking moving process this time, will be referred to as "the parking lot information Ipark in use."

Figure 18D:
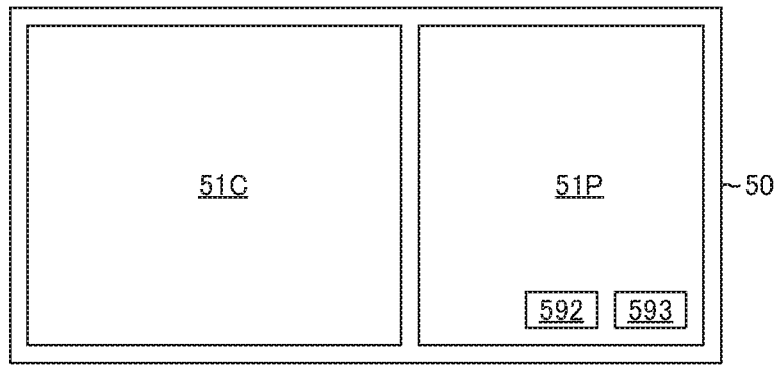

For example, when the parking lot information Ipark in use is the first parking lot information Ipark_1, the vehicle parking assist apparatus 10 does not display the first information deleting button image 591 on the display 50 and displays the second information deleting button image 592 and the third information deleting button image 593 on the display 50 as shown in FIG. 18D. In this case, the vehicle parking assist apparatus 10 deletes the second parking lot information Ipark_2 when the driver applies the touch interaction to the second information deleting button image 592. Similarly, the vehicle parking assist apparatus 10 deletes the third parking lot information Ipark_3 when the driver applies the touch interaction to the third information deleting button image 593. In this case, the first information deleting button image 591 is not displayed on the display 50. Therefore, the driver cannot apply the touch interaction to the first information deleting button image 591. Thus, the first parking lot information Ipark_1 cannot be deleted.

Thereby, the parking lot information Ipark in use cannot be deleted. Thus, the vehicle parking assist apparatus 10 can park the vehicle 100 accurately in the target parking area 61tgt.

The vehicle parking assist apparatus 10 may be configured to display the first information deleting button image 591, the second information deleting button image 592, and the third information deleting button image 593 on the display 50 when the driver applies the touch interaction to the information deleting button image 58 even after the vehicle parking assist apparatus 10 starts to execute the second parking moving process. In this case, the vehicle parking assist apparatus 10 may be configured not to delete the parking lot information Ipark in use even if the driver applies the touch interaction to the first information deleting button image 591, the second information deleting button image 592, or the third information deleting button image 593 corresponding to the parking lot information Ipark in use. In this regard, the vehicle parking assist apparatus 10 may be configured to display the first information deleting button image 59L the second information deleting button image 592, or the third information deleting button image 593 corresponding to the parking lot information Ipark in use on the display 50 with a luminance level lower than the luminance levels of the first information deleting button image 591, the second information deleting button image 592, or the third information deleting button image 593 not corresponding to the parking lot information Ipark in use. In other words, the vehicle parking assist apparatus 10 may be configured to display the first information deleting button image 591, the second information deleting button image 592, or the third information deleting button image 593 corresponding to the parking lot information Ipark in use on the display 50 with the toned-down luminance level. Alternatively, the vehicle parking assist apparatus 10 may be configured to display the first information deleting button image 591, the second information deleting button image 592, or the third information deleting button image 593 corresponding to the parking lot information Ipark in use on the display 50 with a luminance level lower than the luminance levels of two of the first information deleting button image 591 to the third information deleting button image 593 not corresponding to the parking lot information Ipark in use. In other words, the vehicle parking assist apparatus 10 may be configured to display the first information deleting button image 591, the second information deleting button image 592, or the third information deleting button image 593 corresponding to the parking lot information Ipark in use on the display 50 with the toned-down luminance level.

Further, the vehicle parking assist apparatus 10 may be configured to terminate displaying the information deleting button image 58 on the display 50 when the vehicle parking assist apparatus 10 starts to execute the second parking moving process. In other words, the vehicle parking assist apparatus 10 may be configured not to display the information deleting button image 58 on the display 50 after the vehicle parking assist apparatus 10 starts to execute the second parking moving process. Basically, the vehicle parking assist apparatus 10 may be configured (i) to delete the parking lot information Ipark requested to be deleted as the vehicle parking assist apparatus 10 does not use all the sets of the parking lot information Ipark in executing the second parking moving process and (ii) not to delete any of the sets of the parking lot information Ipark as the vehicle parking assist apparatus 10 uses any of the sets of the parking lot information Ipark in executing the second parking moving process.

Further, in the embodiment, the vehicle parking assist apparatus 10 can register three sets of the parking lot information Ipark. In this regard, the vehicle parking assist apparatus 10 may register two or four or more sets of the parking lot information Ipark.

Further, the vehicle parking assist apparatus 10 may register only one set of the parking lot information Ipark. In this case, the vehicle parking assist apparatus 10 may be configured to display the information deleting button image on the display 50 when the vehicle parking assist apparatus 10 does not execute the second parking moving process, in particular, the vehicle parking assist apparatus 10 does not use the parking lot information Ipark. In addition, the vehicle parking assist apparatus 10 may be configured to delete the parking lot information Ipark when the driver applies the touch interaction to the information deleting button image. In addition, the vehicle parking assist apparatus 10 may be configured not to display the information deleting button image on the display 50 as the vehicle parking assist apparatus 10 executes the second parking moving process, in particular, the vehicle parking assist apparatus 10 uses the parking lot information Ipark in executing the second parking moving process. Basically, the vehicle parking assist apparatus 10 may be configured (i) to delete the parking lot information Ipark as the vehicle parking assist apparatus 10 does not uses the parking lot information Ipark in executing the second parking moving process, and a deletion of the parking lot information Ipark is requested and (ii) not to delete the parking lot information Ipark as the vehicle parking assist apparatus 10 uses the parking lot information Ipark in executing the second parking moving process.

Further, the vehicle parking assist apparatus 10 may be configured to display the information deleting button image on the display 50 when (i) the vehicle parking assist apparatus 10 is configured to register only one set of the parking lot information Ipark, and (ii) the vehicle parking assist apparatus 10 executes the second parking moving process, in particular, the vehicle parking assist apparatus 10 uses the parking lot information Ipark in executing the second parking moving process. In this case, the vehicle parking assist apparatus 10 may be configured not to delete the parking lot information Ipark even when the driver applies the touch interaction to the information deleting button image. Basically, the vehicle parking assist apparatus 10 may be configured (i) to delete the parking lot information Ipark as the vehicle parking assist apparatus 10 does not use the parking lot information Ipark in executing the second parking moving process, and the deletion of the parking lot information Ipark is requested and (ii) not to delete the parking lot information Ipark as the vehicle parking assist apparatus 10 uses the parking lot information Ipark in executing the second parking moving process. In this case, the vehicle parking assist apparatus 10 may be configured to display the information deleting button image on the display 50 with the lower luminance level when the vehicle parking assist apparatus 10 uses the parking lot information Ipark in executing the second parking moving process than the luminance levels when the vehicle parking assist apparatus 10 does not use the parking lot information Ipark in executing the second parking moving process. In other words, the vehicle parking assist apparatus 10 may be configured to display the information deleting button image on the display 50 with the toned-down luminance level <Specific Operations of Vehicle Parking Assist Apparatus>

Figure 19:
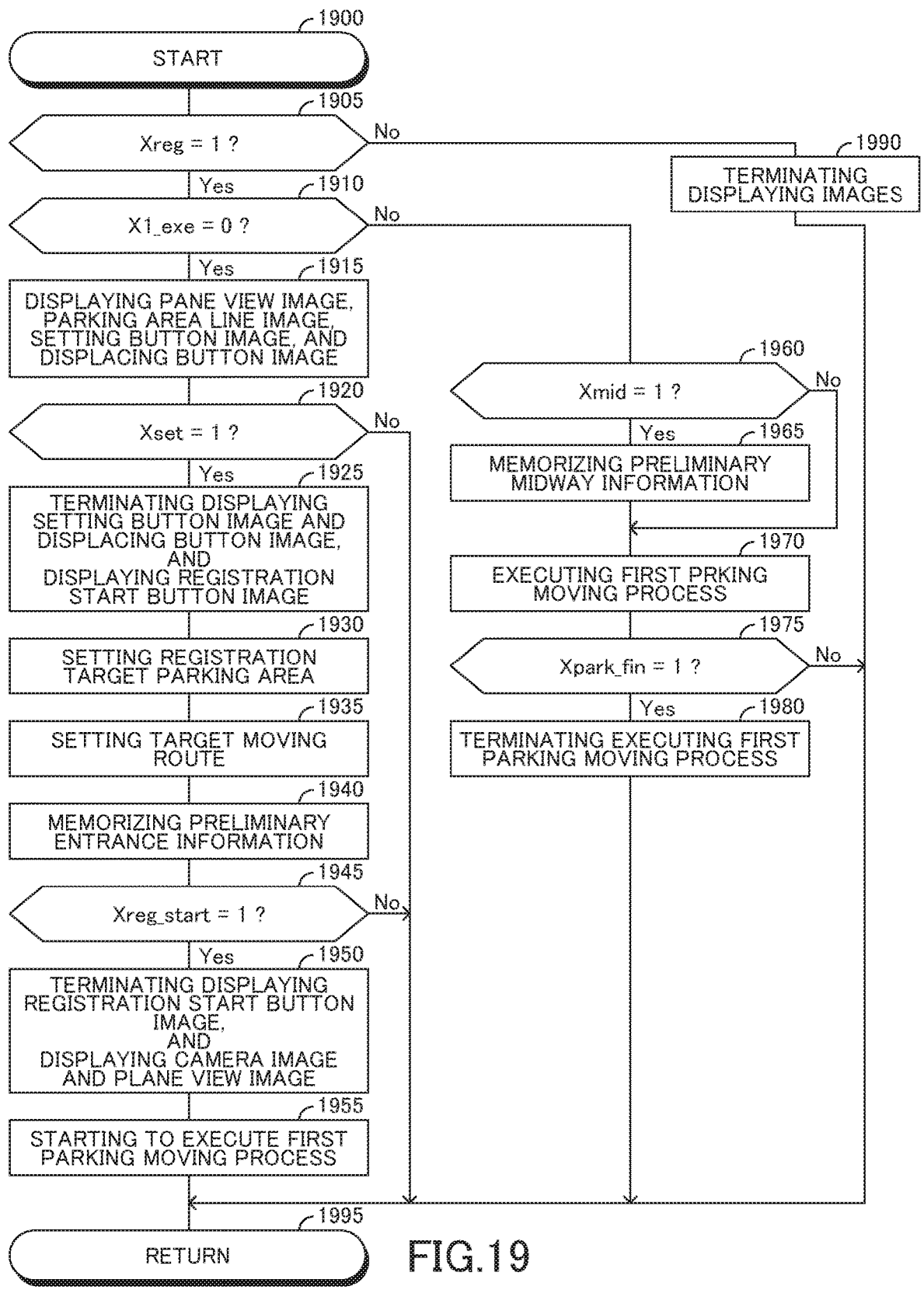
FIG. 19 is a view which shows a flowchart of a routine executed by a CPU of an ECU shown in FIG. 1.

Next, specific operations of the vehicle parking assist apparatus 10 will be described. The CPU of the ECU 90 of the vehicle parking assist apparatus 10 is configured or programmed to execute a routine shown in FIG. 19 each time a predetermined time elapses.

Therefore, at a predetermined timing, the CPU starts to execute a process from a step 1900 and then, proceeds with the process to a step 1905 to determine whether a value of a registration flag Xreg is "1." The value of the registration flag Xreg is set to "1" when the CPU determines that the vehicle 100 stops by the entrance 62ent of the parking lot 62. On the other hand, the value of the registration flag Xreg is set to "0" when the vehicle 100 moves away from the parking lot 62. Also, the value of the registration flag Xreg is set to "0" when parking the vehicle 100 in the parking lot 62 by the parking assist control is completed.

When the CPU determines "Yes" at the step 1905, the CPU proceeds with the process to a step 1910 to determine whether a value of a first parking moving process flag X1_exe is "0." The value of the first parking moving process flag X1_exe is set to "1" when the execution of the first parking moving process is started. On the other hand, the value of the first parking moving process flag X1_exe is set to "0" when the execution of the first parking moving process is terminated.

When the CPU determines "Yes" at the step 1910, the CPU proceeds with the process to a step 1915 to display the plane view image 51P, the parking area line image 52, the setting button image 53, and the displacing button image 57 on the display 50 (see FIG. 9A).

Next, the CPU proceeds with the process to a step 1920 to determine whether a value of a setting completed flag Xset is "1". The value of the setting completed flag Xset is set to "1" when the touch interaction is applied to the setting button image 53. On the other hand, the value of the setting completed flag Xset is set to "0" when the execution of the first parking moving process is started.

When the CPU determines "Yes" at the step 1920, the CPU proceeds with the process to a step 1925 to terminate displaying the setting button image 53 and the displacing button image 57 on the display 50 and display the registration start button image 54 on the display 50 (see FIG. 98). Next, the CPU proceeds with the process to a step 1930 to set the registration target parking area 61set to the parking area 61 corresponding to the parking area line image 52. Next, the CPU proceeds with the process to a step 1935 to set the target moving route Rtgt to a moving route of the vehicle 100 to the registration target parking area 61set. Next, the CPU proceeds with the process to a step 1940 to acquire the preliminary entrance information Ient_pre as described above and memorize the acquired preliminary entrance information Ient_pre in the RAM.

Next, the CPU proceeds with the process to a step 1945 to determine whether a value of a registration start flag Xreg_start is "1." The value of the registration start flag Xreg_start is set to "1" when the touch interaction is applied to the registration start button image 54. On the other hand, the value of the registration start flag Xreg_start is set to "0" when the execution of the first parking moving process is started.

When the CPU determines "Yes" at the step 1945, the CPU proceeds with the process to a step 1950 to terminate displaying the registration start button image 54 on the display 50 and display the camera image 51C and the plane view image 51P on the display 50 (see FIG. 9C). Next, the CPU proceeds with the process to a step 1955 to start to execute the first parking moving process to move the vehicle 100 to the registration target parking area 61set along the target moving route Rtgt. Next, the CPU proceeds with the process to a step 1995 to terminate executing this routine once.

On the other hand, when the CPU determines "No" at the step 1945, the CPU proceeds with the process to the step 1995 to terminate executing this routine once.

Also, when the CPU determines "No" at the step 1920, the CPU proceeds with the process to the step 1995 to terminate executing this routine once.

When the CPU determines "No" at the step 1910, the CPU proceeds with the process to a step 1960 to determine whether a value of a midway information acquiring flag Xmid is "1." The value of the midway information acquiring flag Xmid is set to "1" when the CPU predicts that the vehicle 100 continues moving rearward straight without turning until the CPU completes parking the vehicle 100 in the parking lot 62 by the parking assist control. On the other hand, the value of the midway information acquiring flag Xmid is set to "O" when an execution of a process of a step 1965 is completed.

When the CPU determines "Yes" at the step 1960, the CPU proceeds with the process to a step 1965 to acquire the preliminary midway information Imid_pre as described above and memorize the acquired preliminary midway information Imid_pre in the RAM. Next, the CPU proceeds with the process to a step 1970.

On the other hand, when the CPU determines "No" at the step 1960, the CPU proceeds with the process to a step 1970.

When the CPU proceeds with the process to the step 1970, the CPU continues executing the first parking moving process. Next, the CPU proceeds with the process to a step 1975 to determine whether a value of a parking completed flag Xpark_fin is "1." The value of the parking completed flag Xpark_fin is set to "1" when the entire vehicle 100 has moved in the registration target parking area 61*set*. On the other hand, the value of the parking completed flag Xpark_fin is set to "0" when the execution of the first parking moving process is completed.

When the CPU determines "Yes" at the step 1975, the CPU proceeds with the process to a step 1980 to terminate executing the first parking moving process. Next, the CPU proceeds with the process to the step 1995 to terminate executing this routine once.

On the other hand, when the CPU determines "No" at the step 1975, the CPU proceeds with the process to the step 1995 to terminate executing this routine once.

When the CPU determines "No" at the step 1905, the CPU proceeds with the process to a step 1990 to terminate displaying the plane view image 51P, etc. on the display 50. Next, the CPU proceeds with the process to the step 1995 to terminate executing this routine once.

Figure 20:
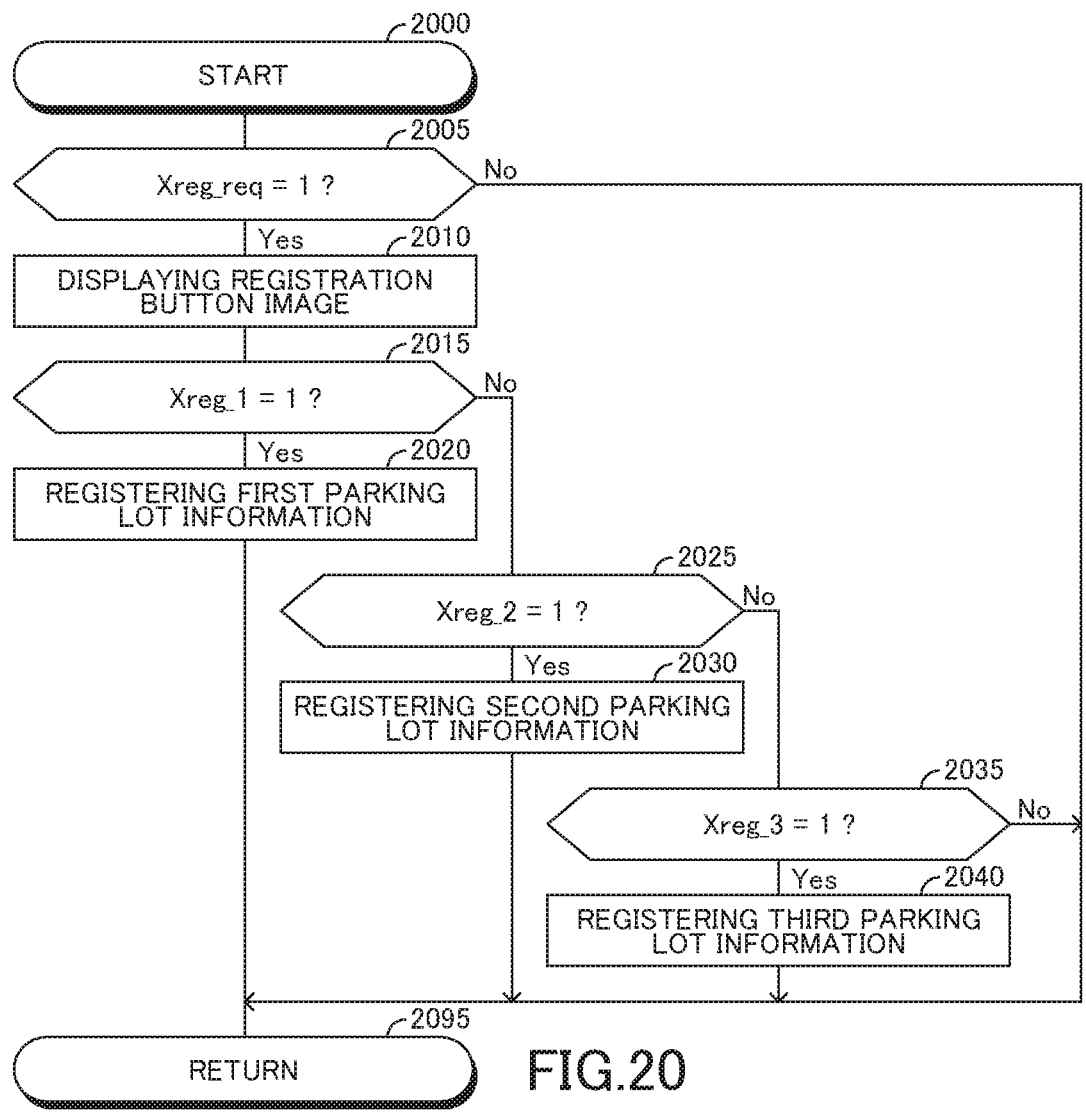
FIG. 20 is a view which shows a flowchart of a routine executed by the CPU.

In addition, the CPU is configured or programmed to execute a routine shown in FIG. 20 each time the predetermined time elapses. Therefore, at a predetermined timing, the CPU starts to execute a process from a step 2000 in FIG. 20 and then, proceeds with the process to a step 2005 to determine whether a value of an information registration request flag Xreg_req is "1." The value of the information registration request flag Xreg_req is set to "1" when parking the vehicle 100 in the parking lot 62 by the first parking moving process is completed. On the other hand, the value of the information registration request flag Xreg_req is set to "0" when the parking lot information Ipark is registered in the RAM.

When the CPU determines "Yes" at the step 2005, the CPU proceeds with the process to a step 2010 to display the registering button image 55 on the display 50 (see FIG. 9D). Next, the CPU proceeds with the process to a step 2015 to determine whether a value of a first information registering flag Xreg_1 is "1." The value of the first information registering flag Xreg_1 is set to "1" when the touch interaction is applied to the first registering button image 551. On the other hand, the value of the first information registering flag Xreg_1 is set to "0" when the first parking lot information Ipark_1 is registered in the RAM.

When the CPU determines "Yes" at the step 2015, the CPU proceeds with the process to a step 2020 to register the parking lot information Ipark acquired as described above as the first parking lot information Ipark_1 in the RAM. Next, the CPU proceeds with the process to a step 2095 to terminate executing this routine once.

On the other hand, when the CPU determines "Yes" at the step 2015, the CPU proceeds with the process to a step 2025 to determine whether a value of a second information registering flag Xreg_2 is "1." The value of the second information registering flag Xreg_2 is set to "1" when the touch interaction is applied to the second registering button image 552. On the other hand, the value of the second information registering flag Xreg_2 is set to "0" when the second parking lot information Ipark_2 is registered in the RAM.

When the CPU determines "Yes" at the step 2025, the CPU proceeds with the process to a step 2030 to register the parking lot information Ipark acquired as described above as the second parking lot information Ipark_2 in the RAM. Next, the CPU proceeds with the process to the step 2095 to terminate executing this routine once.

On the other hand, when the CPU determines "Yes" at the step 2025, the CPU proceeds with the process to a step 2035 to determine whether a value of a third information registering flag Xreg_3 is "1." The value of the third information registering flag Xreg_3 is set to "1" when the touch interaction is applied to the third registering button image 553. On the other hand, the value of the third information registering flag Xreg_3 is set to "0" when the third parking lot information Ipark_3 is registered in the RAM.

When the CPU determines "Yes" at the step 2035, the CPU proceeds with the process to a step 2040 to register the parking lot information Ipark acquired as described above as the third parking lot information Ipark_3 in the RAM. Next, the CPU proceeds with the process to the step 2095 to terminate executing this routine once.

When the CPU determines "No" at the step 2005, the CPU proceeds with the process to the step 2095 to terminate executing this routine once.

Figure 21:
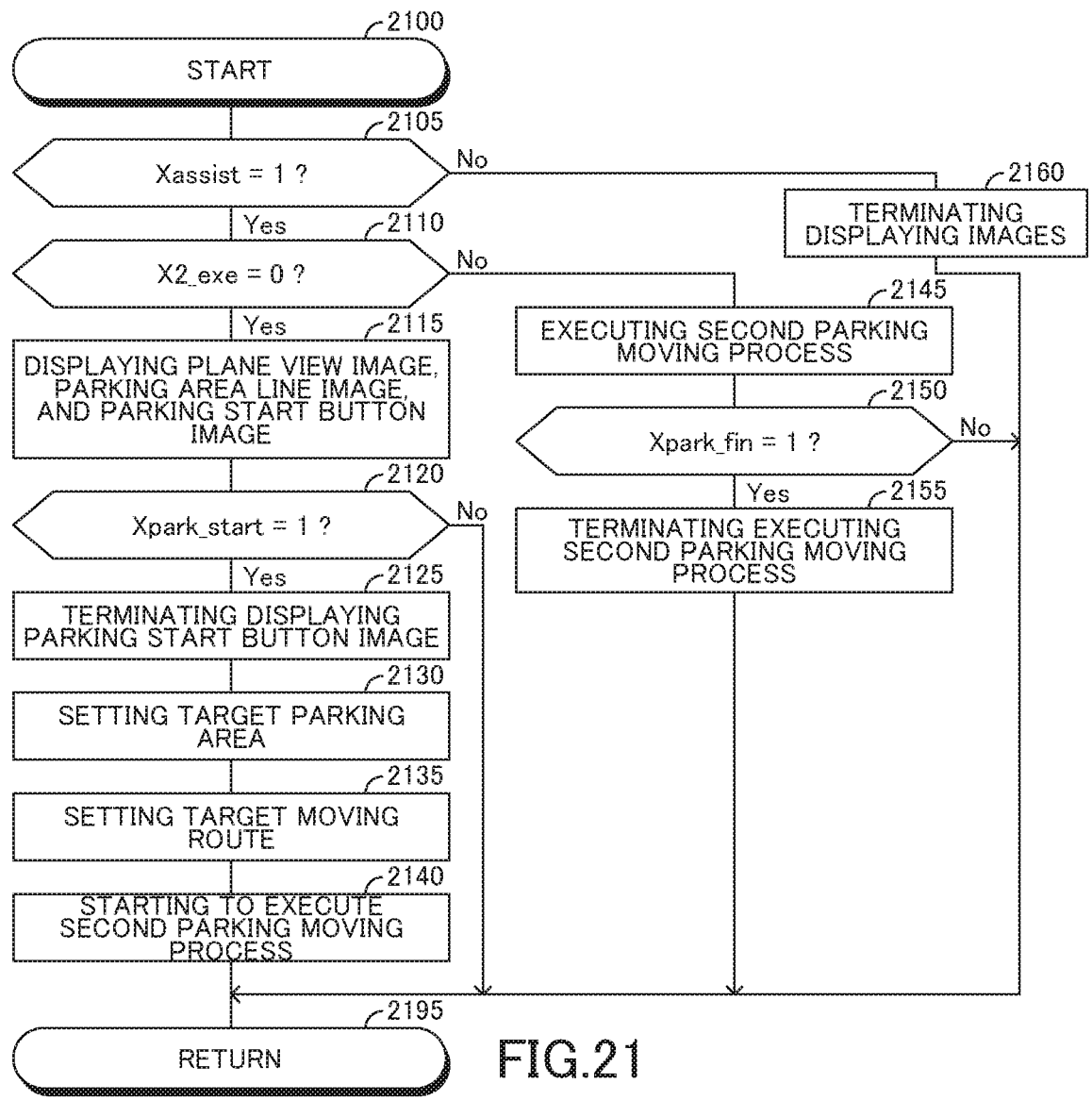
FIG. 21 is a view which shows a flowchart of a routine executed by the CPU.

In addition, the CPU is configured or programmed to execute a routine shown in FIG. 21 each time the predetermined time elapses. Therefore, at a predetermined timing, the CPU starts to execute a process from a step 2100 in FIG. 21 and then, proceeds with the process to a step 2105 to determine whether a value of an assist flag Xassist is "1." The value of the assist flag Xassist is set to "1" when the vehicle 100 stops by the entrance 62*ent* of the registered parking lot 62. On the other hand, the value of the assist flag Xassist is set to "0" when the vehicle 100 moves away from the parking lot 62. Also, the value of the assist flag Xassist is set to "0" when parking the vehicle 100 in the parking lot 62 by the parking assist control is completed.

When the CPU determines "Yes" at the step 2105, the CPU proceeds with the process to a step 2110 to determine whether a value of a second parking moving process flag X2_exe is "0." The value of the second parking moving process flag X2_exe is set to "1" when an execution of the second parking moving process is started. On the other hand, the value of the second parking moving process flag X2_exe is set to "0" when the execution of the second parking moving process is terminated.

When the CPU determines "Yes" at the step 2110, the CPU proceeds with the process to a step 2115 to display the plane view image 51P, the parking area line image 52, and the parking start button image 56 on the display 50 (see FIG. 18A).

Next, the CPU proceeds with the process to a step 2120 to determine whether a value of a parking start flag Xpark_start is "1." The value of the parking start flag Xpark_start is set to "1" when the touch interaction is applied to the parking start button image 56. On the other hand, the value of the parking start flag Xpark_start is set to "0" when the execution of the second parking moving process is started.

When the CPU determines "Yes" at the step 2120, the CPU proceeds with the process to a step 2125 to terminate displaying the parking start button image 56 on the display 50 (see FIG. 18B). Next, the CPU proceeds with the process to a step 2130 to set the target parking area 61*tgt* to the parking area 61 registered by the parking lot information Ipark. Next, the CPU proceeds with the process to a step 2135 to set the target moving route Rtgt to the moving route of the vehicle 100 to the target parking area 61*tgt*. Next, the CPU proceeds with the process to a step 2140 to start to execute the second parking moving process. Next, the CPU proceeds with the process to a step 2195 to terminate executing this routine once.

On the other hand, when the CPU determines "No" at the step 2120, the CPU proceeds with the process to the step 2195 to terminate executing this routine once.

When the CPU determines "No" at the step 2110, the CPU proceeds with the process to a step 2145 to execute the second parking moving process. Next, the CPU proceeds with the process to a step 2150 to determine whether a value of a parking completed flag Xpark_fin is "1." The value of the parking completed flag Xpark_fin is set to "1" when the entire vehicle 100 has moved in the target parking area 61*tgt*. On the other hand, the value of the parking completed flag Xpark_fin is set to "0" when the execution of the second parking moving process is terminated.

When the CPU determines "Yes" at the step 2150, the CPU proceeds with the process to a step 2155 to terminate executing the second parking moving process. Next, the CPU proceeds with the process to the step 2195 to terminate executing this routine once.

On the other hand, when the CPU determines "No" at the step 2150, the CPU proceeds with the process to the step 2195 to terminate executing this routine once.

When the CPU determines "No" at the step 2105, the CPU proceeds with the process to a step 2160 to terminate displaying the plane view image 51P, etc. on the display 50. Next, the CPU proceeds with the process to the step 2195 to terminate executing this routine once.

Figure 22:
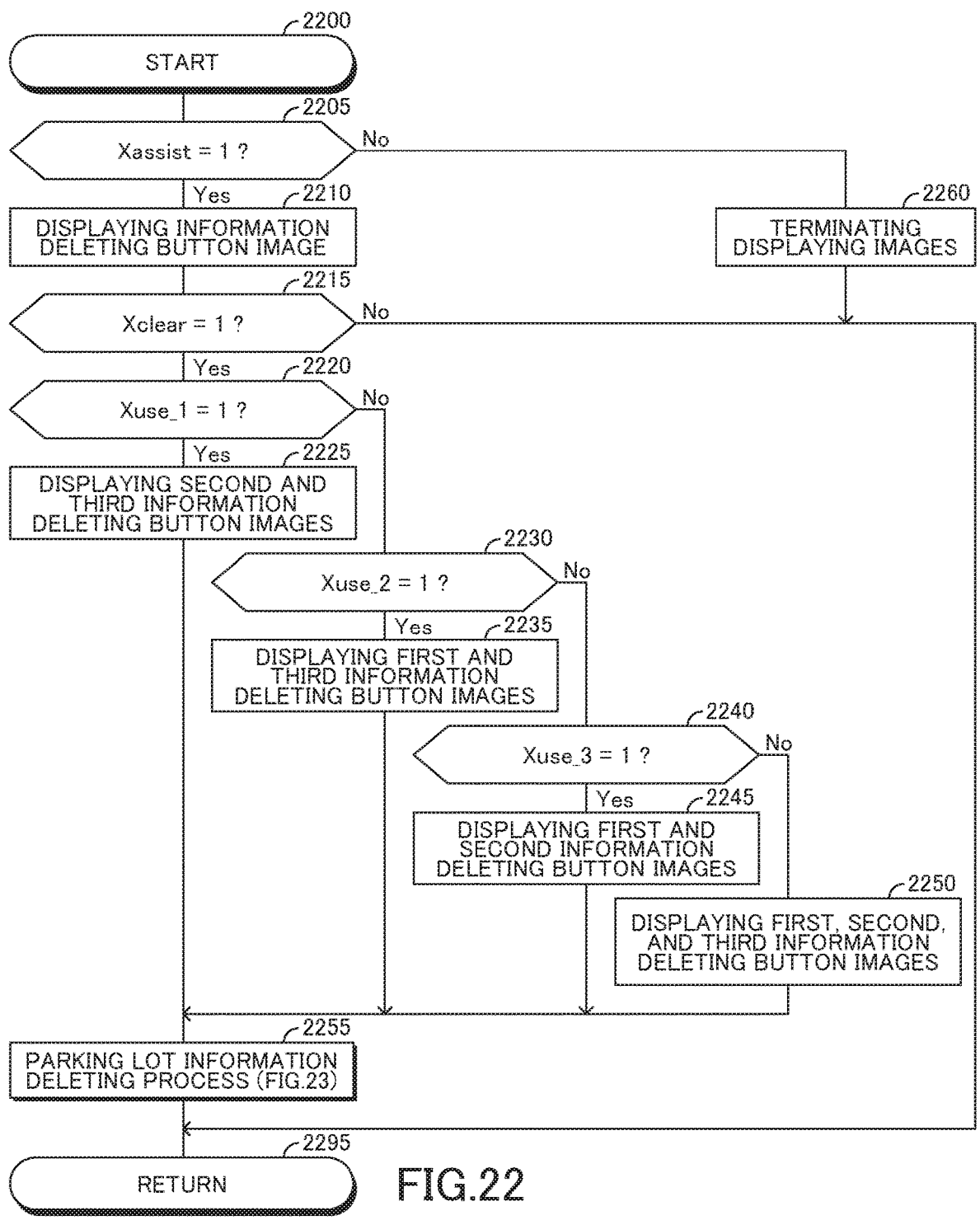
FIG. 22 is a view which shows a flowchart of a routine executed by the CPU.

In addition, the CPU is configured or programmed to execute a routine shown in FIG. 22 each time the predetermined time elapses. Therefore, at a predetermined timing, the CPU starts to execute a process from a step 2200 in FIG. 22 and then, proceeds with the process to a step 2205 to determine whether the value of the assist flag Xassist is "1."

When the CPU determines "Yes" at the step 2205, the CPU proceeds with the process to a step 2210 to display the information deleting button image 58 on the display 50 (see FIG. 18A). Next, the CPU proceeds with the process to a step 2215 to determine whether a value of an information deleting flag Xclear is "1." The value of the information deleting flag Xclear is set to "1" when the touch interaction is applied to the information deleting button image 58. On the other hand, the value of the information deleting flag Xclear is set to "0" when any of the first parking lot information Ipark_1 to the third parking lot information Ipark_3 is deleted.

When the CPU determines "Yes" at the step 2215, the CPU proceeds with the process to a step 2220 to determine whether a value of a first information used flag Xuse_1 is "1." The value of the first information used flag Xuse_1 is set to "1" when the execution of the second parking moving process using the first parking lot information park_1 is started. On the other hand, the value of the first information used flag Xuse_1 is set to "0" when the execution of the second parking moving process using the first parking lot information Ipark_1 is terminated.

When the CPU determines "Yes" at the step 2220, the CPU proceeds with the process to a step 2225 to display the second information deleting button image 592 and the third information deleting button image 593 on the display 50 (see FIG. 18D). Next, the CPU proceeds with the process to a step 2255.

On the other hand, when the CPU determines "No" at the step 2220, the CPU proceeds with the process to a step 2230 to determine whether a value of a second information used flag Xuse_2 is "1." The value of the second information used flag Xuse_2 is set to "1" when the execution of the second parking moving process using the second parking lot information Ipark_2 is started. On the other hand, the value of the second information used flag Xuse_2 is set to "0" when the execution of the second parking moving process using the second parking lot information Ipark_2 is terminated.

When the CPU determines "Yes" at the step 2230, the CPU proceeds with the process to a step 2235 to display the first information deleting button image 591 and the third information deleting button image 593 on the display 50. Next, the CPU proceeds with the process to the step 2255.

On the other hand, when the CPU determines "No" at the step 2230, the CPU proceeds with the process to a step 2240 to determine whether a value of a third information used flag Xuse_3 is "1." The value of the third information used flag Xuse_3 is set to "1" when the execution of the second parking moving process using the third parking lot information Ipark_3 is started. On the other hand, the value of the third information used flag Xuse_3 is set to "0" when the execution of the second parking moving process using the third parking lot information Ipark_3 is terminated.

When the CPU determines "Yes" at the step 2240, the CPU proceeds with the process to a step 2245 to display the first information deleting button image 591 and the second information deleting button image 592 on the display 50. Next, the CPU proceeds with the process to the step 2255.

On the other hand, when the CPU determines "No" at the step 2240, the CPU proceeds with the process to a step 2250 to display the first information deleting button image 591, the second information deleting button image 592, and the third information deleting button image 593 on the display 50 (see FIG. 18C). Next, the CPU proceeds with the process to the step 2255.

Figure 23:
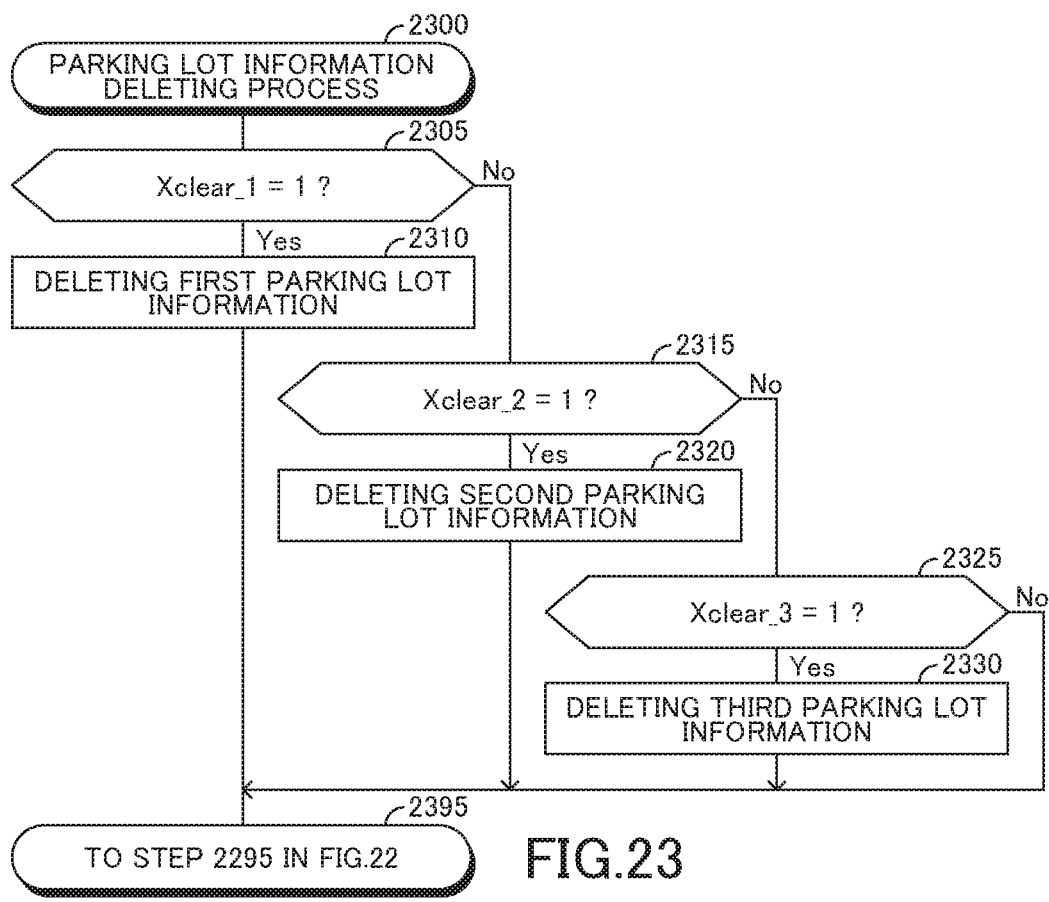
FIG. 23 is a view which shows a flowchart of a routine executed by the CPU.

When the CPU proceeds with the process to the step 2255, the CPU starts to execute a process from a step 2300 in FIG. 23 and then proceeds with the process to a step 2305 to determine whether a value of a first information deleting flag Xclear_1 is "1." The value of the first information deleting flag Xclear_1 is set to "1" when the touch interaction is applied to the first information deleting button image 591. On the other hand, the value of the first information deleting flag Xclear_1 is set to "0" when the first parking lot information Ipark_1 is deleted.

When the CPU determines "Yes" at the step 2305, the CPU proceeds with the process to a step 2310 to delete the first parking lot information Ipark_1. Next, the CPU proceeds with the process to a step 2295 in FIG. 22 via a step 2395 to terminate executing this routine once.

On the other hand, when the CPU determines "No" at the step 2305, the CPU proceeds with the process to a step 2315 to determine whether a value of a second information deleting flag Xclear_2 is "1." The value of the second information deleting flag Xclear_2 is set to "1" when the touch interaction is applied to the second information deleting button image 592. On the other hand, the value of the second information deleting flag Xclear_2 is set to "0" when the second parking lot information Ipark_2 is deleted.

When the CPU determines "Yes" at the step 2315, the CPU proceeds with the process to a step 2320 to delete the second parking lot information Ipark_2. Next, the CPU proceeds with the process to the step 2295 in FIG. 22 via the step 2395 to terminate executing this routine once.

On the other hand, when the CPU determines "No" at the step 2315, the CPU proceeds with the process to a step 2325 to determine whether a value of a third information deleting flag Xclear_3 is "1." The value of the third information deleting flag Xclear_3 is set to "1" when the touch interaction is applied to the third information deleting button image 593. On the other hand, the value of the third information deleting flag Xclear_3 is set to "0" when the third parking lot information Ipark_3 is deleted.

When the CPU determines "Yes" at the step 2325, the CPU proceeds with the process to a step 2330 to delete the third parking lot information Ipark_3. Next, the CPU proceeds with the process to the step 2295 in FIG. 22 via the step 2395 to terminate executing this routine once.

On the other hand, when the CPU determines "No" at the step 2325, the CPU proceeds with the process to the step 2295 in FIG. 22 via the step 2395 to terminate executing this routine once.

When the CPU determines "No" at the step 2215 in FIG. 22, the CPU proceeds with the process to the step 2295 to terminate executing this routine once.

When the CPU determines "No" at the step 2205, the CPU proceeds with the process to a step 2260 to terminate displaying the information deleting button image 58, etc. on the display 50. Next, the CPU proceeds with the process to the step 2295 to terminate executing this routine once.

According to the vehicle parking assist apparatus 10, when the touch interaction is applied to the information deleting button image 58 after the execution of the second parking moving process is started, two of the first information deleting button image 591, the second information deleting button image 592, and the third information deleting button image 593 which do not delete the parking lot information Ipark on the parking lot 62 in which the second parking moving process currently parks the vehicle 100 (see the steps 2225, 2235, and 2245 in FIG. 22). Therefore, the parking lot information Ipark on the parking lot 62 in which the second parking moving process currently parks the vehicle 100, is not deleted. Thus, the vehicle 100 can be assuredly parked in the target parking area 61tgt.

Figure 24:
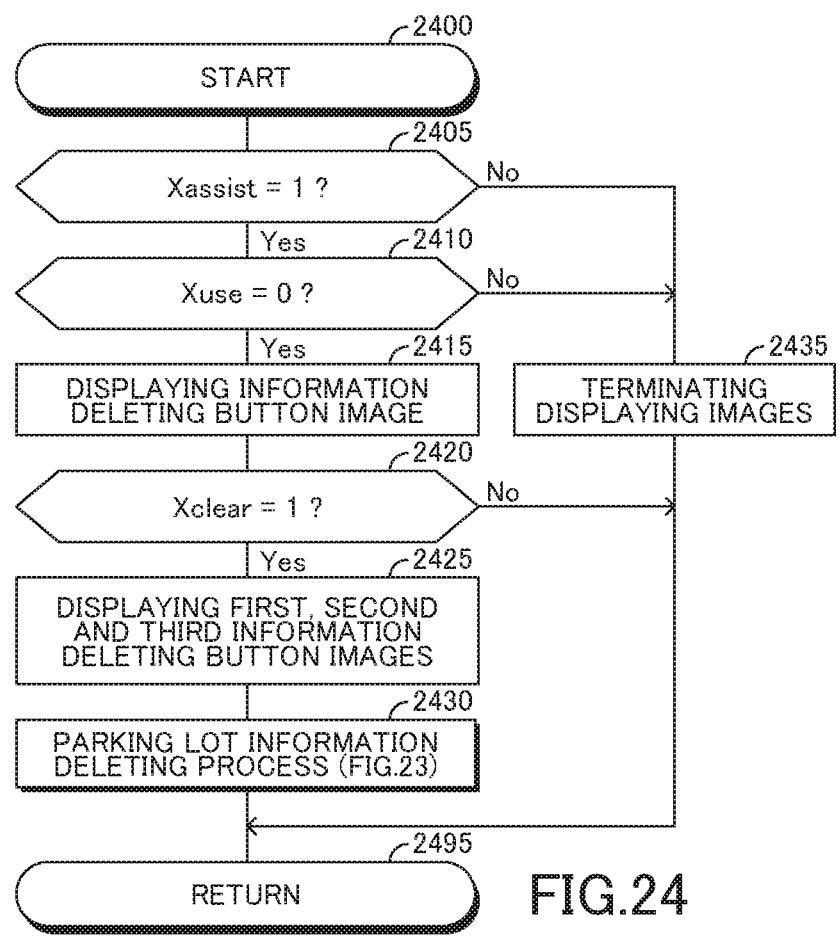
FIG. 24 is a view which shows a flowchart of a routine executed by the CPU.

The CPU may be configured or programmed to execute a routing shown in FIG. 24 each time the predetermined time elapses in place of the routine shown in FIG. 22. In this case, at a predetermined timing, the CPU starts to execute a process from a step 2400 in FIG. 24 and then proceeds with the process to a step 2405 to determine whether the value of the assist flag Xassist is "1."

When the CPU determines "Yes" at the step 2405, the CPU proceeds with the process to a step 2410 to determine whether a value of an information used flag Xuse is "0." The value of the information used flag Xuse is set to "1" when the execution of the second parking moving process is started. On the other hand, the value of the information used flag Xuse is set to "0" when the execution of the second parking moving process is terminated.

When the CPU determines "Yes" at the step 2410, the CPU proceeds with the process to a step 2415 to display the information deleting button image 58 on the display 50 (see FIG. 18A). Next, the CPU proceeds with the process to a step 2420 to determine whether the value of the information deleting flag Xclear is "1." The value of the information deleting flag Xclear is set to "1" when the touch interaction is applied to the information deleting button image 58. On the other hand, the value of the information deleting flag Xclear is set to "0" when any of the first parking lot information Ipark_1 to the third parking lot information Ipark_3 is deleted.

When the CPU determines "Yes" at the step 2420, the CPU proceeds with the process to a step 2425 to display the first information deleting button image 591 to the third information deleting button image 593 on the display 50 (see FIG. 18C). Next, the CPU proceeds with the process to a step 2430 to execute a parking lot information deleting process by executing the routine shown in FIG. 23 as described above.

On the other hand, when the CPU determines "No" at the step 2420, the CPU proceeds with the process to a step 2495 to terminate executing this routine once.

When the CPU determines "No" at the step 2410, the CPU proceeds with the process to a step 2435 to terminate displaying the information deleting button image 58, etc. on the display 50. Next, the CPU proceeds with the process to the step 2495 to terminate executing this routine once.

Also, when the CPU determines "No" at the step 2405, the CPU proceeds with the process to the step 2435 to terminate displaying the information deleting button image 58, etc. on the display 50. Next, the CPU proceeds with the process to the step 2495 to terminate executing this routine once.

Thereby, the information deleting button image 58 is not displayed on the display 50 after the execution of the second parking moving process is started (see the process executed in the case of a determination "No" at the step 2410). Therefore, the parking lot information Ipark on the parking lot 62 in which the second parking moving process parks the vehicle 100, is not deleted. Thus, the vehicle 100 can be assuredly parked in the target parking area 61tgt.

It should be noted that the invention is not limited to the aforementioned embodiments, and various modifications can be employed within the scope of the invention.

What is claimed is:

1. A vehicle parking assist apparatus comprising:
   at least one sensor mounted on a vehicle to detect information on a parking lot used to autonomously park the vehicle in the parking lot; and
   an electronic control unit which can execute a parking assist control to autonomously park the vehicle in the parking lot with using the information on the parking lot detected by the at least one sensor,
   wherein:
   the electronic control unit is configured to:
      register the information on the parking lot as parking lot information, wherein the parking lot information includes first parking lot information and second parking lot information; and
      execute the parking assist control with using the parking lot information; and
   the electronic control unit is further configured to:
      when the electronic control unit executes the parking assist control without using one of the first parking lot information and the second parking lot information, allow a user of the vehicle to request a deletion of the one of the first parking lot information and the second parking lot information;
      when the electronic control unit executes the parking assist control with using the one of the first parking lot information and the second parking lot information, prevent the user of the vehicle from requesting the deletion of the one of the first parking lot information and the second parking lot information; and
      delete the one of the first parking lot information and the second parking lot information when the deletion of the one of the first parking lot information and the second parking lot information is requested.

2. The vehicle parking assist apparatus as set forth in claim 1, wherein:
   the vehicle parking assist apparatus further comprises a display;
   the electronic control unit can display an information deleting image on the display to which the user of the vehicle can apply a touch interaction to request the deletion of the parking lot information; and
   the electronic control unit is configured:
      to display the information deleting image on the display to allow the user of the vehicle to request the deletion of the parking lot information as the electronic control unit executes the parking assist control without using the parking lot information;

not to display the information deleting image on the display to prevent the user of the vehicle from requesting the deletion of the parking lot information as the electronic control unit executes the parking assist control with using the parking lot information.

3. The vehicle parking assist apparatus as set forth in claim 1, wherein:

the parking lot information includes a first parking lot information and a second parking lot information; and the electronic control unit is further configured:

to allow the user of the vehicle to request the deletion of the first parking lot information and the deletion of the second parking lot information as the electronic control unit executes the parking assist control without using the first parking lot information and the second parking lot information;

to (i) allow the user of the vehicle to request the deletion of the first parking lot information and (ii) prevent the user of the vehicle from requesting the deletion of the second parking lot information as the electronic control unit executes the parking assist control with using the second parking lot information without using the first parking lot information; and to (i) allow the user of the vehicle to request the deletion of the second parking lot information and (ii) prevent the user of the vehicle from requesting the deletion of the first parking lot information as the electronic control unit executes the parking assist control with using the first parking lot information without using the second parking lot information.

4. The vehicle parking assist apparatus as set forth in claim 3, wherein:

the vehicle parking assist apparatus further comprises a display;

the electronic control unit can display a first information deleting image on the display to which the user of the vehicle can apply a touch interaction to request the deletion of the first parking lot information and display a second information deleting image on the display to which the user of the vehicle can apply the touch interaction to request the deletion of the second parking lot information; and the electronic control unit is configured:

to display the first information deleting image and the second information deleting image on the display to allow the user of the vehicle to request the deletion of the first parking lot information and the deletion of the second parking lot information as the electronic control unit executes the parking assist control without using the first parking lot information and the second parking lot information;

to display the first information deleting image on the display without displacing the second information deleting image to (i) allow the user of the vehicle to request the deletion of the first parking lot information and (ii) prevent the user of the vehicle from requesting the deletion of the second parking lot information as the electronic control unit executes the parking assist control with using the second parking lot information without using the first parking lot information; and to display the second information deleting image on the display without displaying the first information deleting image to (i) allow the user of the vehicle to request the deletion of the second parking lot information and (ii) prevent the user of the vehicle from requesting the deletion of the first parking lot information as the electronic control unit executes the parking assist control with using the first parking lot information without using the second parking lot information.

5. The vehicle parking assist apparatus as set forth in claim 1, wherein:

the parking log information includes a first parking lot information and a second parking lot information; and the electronic control unit is further configured:

to allow the user of the vehicle to request the deletion of the first parking lot information and the deletion of the second parking lot information as the electronic control unit executes the parking assist control without using the first parking lot information and the second parking lot information;

to prevent the user of the vehicle from requesting the deletion of the first parking lot information and the deletion of the second parking lot information as the electronic control unit executes the parking assist control with using the second parking lot information without using the first parking lot information; and to prevent the user of the vehicle from requesting the deletion of the first parking lot information and the deletion of the second parking lot information as the electronic control unit executes the parking assist control with using the first parking lot information without using the second parking lot information.

6. The vehicle parking assist apparatus as set forth in claim 5, wherein:

the vehicle parking assist apparatus further comprises a display;

the electronic control unit can display a first information deleting image on the display to which the user of the vehicle can apply a touch interaction to request the deletion of the first parking lot information and display a second information deleting image on the display to which the user of the vehicle can apply the touch interaction to request the deletion of the second parking lot information; and the electronic control unit is configured:

to display the first information deleting image and the second information deleting image on the display to allow the user of the vehicle to request the deletion of the first parking lot information and the deletion of the second parking lot information as the electronic control unit executes the parking assist control without using the first parking lot information and the second parking lot information;

not to display the first information deleting image and the second information deleting image on the display to prevent the user of the vehicle from requesting the deletion of the first parking lot information and the deletion of the second parking lot information as the electronic control unit executes the parking assist control with using the second parking lot information without using the first parking lot information; and not to display the first information deleting image and the second information deleting image on the display to prevent the user of the vehicle from requesting the deletion of the first parking lot information and the deletion of the second parking lot information as the electronic control unit executes the parking assist control with using the first parking lot information without using the second parking lot information.

7. The vehicle parking assist apparatus as set forth in claim 1, wherein:
the at least one sensor is at least one camera mounted on the vehicle to take images of views surrounding the vehicle; and
the at least one camera detects information on the taken image of the parking lot as the information on the parking lot.

8. The vehicle parking assist apparatus as set forth in claim 7, wherein:
the at least one camera includes:
a front camera which takes the image of the view ahead of the vehicle;
rear camera which takes the image of the view behind the vehicle;
a left camera which takes the image of the view at the left side of the vehicle; and
a right camera which takes the image of the view at the right side of the vehicle.

9. The vehicle parking assist apparatus as set forth in claim 7, wherein:
the at least one sensor is at least one camera mounted on the vehicle to take images of views surrounding the vehicle; and
the at least one camera detects information on feature points in the taken image of the parking lot as the information on the parking lot.

10. The vehicle parking assist apparatus as set forth in claim 1, wherein:
the electronic control unit is configured to execute the parking assist control with realizing a relationship in position between the vehicle and the parking lot by comparing the information on the parking lot currently detected by the at least one sensor with the parking lot information.

11. A vehicle parking assist apparatus comprising:
at least one sensor mounted on a vehicle to detect information on a parking lot used to autonomously park the vehicle in the parking lot; and
an electronic control unit which can execute a parking assist control to autonomously park the vehicle in the parking lot with using the information on the parking lot detected by the at least one sensor,
wherein:
the electronic control unit is configured to:
register the information on the parking lot as parking lot information, wherein the parking lot information includes first parking lot information and second parking lot information; and
execute the parking assist control with using the parking lot information; and
the electronic control unit is further configured to:
when the electronic control unit executes the parking assist control without using one of the first parking lot information and the second parking lot information, delete the one of the first parking lot information and the second parking lot information when a deletion of the one of the first parking lot information and the second parking lot information is requested by a user of the vehicle; and
when the electronic control unit executes the parking assist control with using the one of the first parking lot information and the second parking lot information, not delete the one of the first parking lot information and the second parking lot information even when the deletion of the one of the first parking lot information and the second parking lot information is requested by the user of the vehicle.

12. The vehicle parking assist apparatus as set forth in claim 11, wherein:
the vehicle parking assist apparatus further comprises a display; and
the electronic control unit is configured:
to display an information deleting image on the display to which the user of the vehicle can apply a touch interaction to request the deletion of the parking lot information; and
to determine that the deletion of the parking lot information is requested when the touch interaction is applied to the information deleting image.

13. The vehicle parking assist apparatus as set forth in claim 11, wherein:
the parking lot information includes a first parking lot information and a second parking lot information; and
the electronic control unit is configured:
to delete the first parking lot information when the deletion of the first parking lot information is requested as the electronic control unit executes the parking assist control without using the first parking lot information and the second parking lot information;
to delete the second parking lot information when the deletion of the second parking lot information is requested as the electronic control unit executes the parking assist control without using the first parking lot information and the second parking lot information;
to delete the first parking lot information when the deletion of the first parking lot information is requested as the electronic control unit executes the parking assist control with using the second parking lot information without using the first parking lot information;
not to delete the second parking lot information even when the deletion of the second parking lot information is requested as the electronic control unit executes the parking assist control with using the second parking lot information without using the first parking lot information;
to delete the second parking lot information when the deletion of the second parking lot information is requested as the electronic control unit executes the parking assist control with using the first parking lot information without using the second parking lot information; and
not to delete the first parking lot information even when the deletion of the first parking lot information is requested as the electronic control unit executes the parking assist control with using the first parking lot information without using the second parking lot information.

14. The vehicle parking assist apparatus as set forth in claim 13, wherein:
the vehicle parking assist apparatus further comprises a display; and
the electronic control unit is configured:
to (i) display a first information deleting image on the display to which the user of the vehicle can apply a touch interaction to request the deletion of the first parking lot information and (ii) display a second information deleting image on the display to which the user of the vehicle can apply the touch interaction to request the deletion of the second parking lot information;

to determine that the deletion of the first parking lot information is requested when the touch interaction is applied to the first information deleting image; and to determine that the deletion of the second parking lot information is requested when the touch interaction is applied to the second information deleting image.

15. The vehicle parking assist apparatus as set forth in claim 11, wherein:

the at least one sensor is at least one camera mounted on the vehicle to take images of a view surrounding the vehicle; and the at least one camera detects information on the images of the parking lot as the information on the parking lot.

16. The vehicle parking assist apparatus as set forth in claim 15, wherein:

the at least one camera includes:

a front camera which takes the image of the view ahead of the vehicle;

a rear camera which takes the image of the view behind the vehicle;

a left camera which takes the image of the view at the left side of the vehicle; and a right camera which takes the image of the view at the right side of the vehicle.

17. The vehicle parking assist apparatus as set forth in claim 11, wherein:

the at least one sensor is at least one camera mounted on the vehicle to take images of views surrounding the vehicle; and the at least one camera detects information on feature points in the taken image of the parking lot as the information on the parking lot.

18. The vehicle parking assist apparatus as set forth in claim 11, wherein:

the electronic control unit is configured to execute the parking assist control with realizing a relationship in position between the vehicle and the parking lot by comparing the information on the parking lot currently detected by the at least one sensor with the parking lot information.

\* \* \* \* \*